United States Patent
Umehara et al.

(10) Patent No.: US 12,272,234 B2
(45) Date of Patent: Apr. 8, 2025

(54) BASE STATION, ROADSIDE DEVICE, TRAFFIC COMMUNICATION SYSTEM, TRAFFIC MANAGEMENT METHOD, AND TRAINING DATA GENERATION METHOD

(71) Applicant: KYOCERA Corporation, Kyoto (JP)

(72) Inventors: Yuta Umehara, Kawasaki (JP); Tetsuo Okamoto, Sagamihara (JP); Hiroshi Sakai, Sagamihara (JP); Hiroki Fujita, Yokohama (JP); Takatoshi Yoshikawa, Hirakata (JP); Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 446 days.

(21) Appl. No.: 17/571,686

(22) Filed: Jan. 10, 2022

(65) Prior Publication Data
US 2022/0130237 A1 Apr. 28, 2022

Related U.S. Application Data

(63) Continuation of application No. PCT/JP2020/028564, filed on Jul. 22, 2020.

(30) Foreign Application Priority Data

Jul. 29, 2019 (JP) .................................. 2019-138999
Nov. 27, 2019 (JP) .................................. 2019-214078

(51) Int. Cl.
G08G 1/01 (2006.01)
G06T 7/00 (2017.01)
(Continued)

(52) U.S. Cl.
CPC .............. *G08G 1/0116* (2013.01); *G06T 7/00* (2013.01); *G08G 1/0112* (2013.01);
(Continued)

(58) Field of Classification Search
CPC .. G08G 1/0116; G08G 1/0112; G08G 1/0133; G08G 1/0175; G08G 1/0141;
(Continued)

(56) References Cited

U.S. PATENT DOCUMENTS 10,013,877 B2   7/2018  Lu et al.
10,818,167 B2  10/2020  Lu et al.
(Continued)

FOREIGN PATENT DOCUMENTS

JP   2003-157487 A   5/2003
JP   2004-118730 A   4/2004
(Continued)

OTHER PUBLICATIONS

"700 MHz Band Intelligent Transport System", ARIB STD-T109 1.3 version, Association of Radio Industries and Businesses, Jul. 27, 2017, pp. 1-245.

*Primary Examiner* — Daryl C Pope
(74) *Attorney, Agent, or Firm* — Studebaker Brackett PLLC

(57) ABSTRACT

A base station used in a traffic communication system includes a communicator configured to receive, via wireless communication, information transmitted from a vehicle traveling on a road, and a controller configured to identify, based on the information received by the communicator, a traveling behavior including a travel route of the vehicle on the road. The controller is configured to execute first processing for performing statistical learning or machine learning on a plurality of the traveling behaviors respectively identified for a plurality of the vehicles traveling on the road, and second processing for determining, based on a result of the first processing, whether a traffic obstacle is present on the road and a position of the traffic obstacle on the road.

3 Claims, 17 Drawing Sheets

(51) Int. Cl.
    *G08G 1/017*           (2006.01)
    *H04W 4/40*           (2018.01)
    *H04W 4/70*           (2018.01)

(52) U.S. Cl.
    CPC ............ *G08G 1/0133* (2013.01); *H04W 4/40* (2018.02); *H04W 4/70* (2018.02); *G08G 1/0175* (2013.01)

(58) Field of Classification Search
    CPC ........ G08G 1/04; G08G 1/0129; G08G 1/164; G06T 7/00; H04W 4/40; H04W 4/70; H04W 4/024; H04L 67/12; G16Y 10/40; G16Y 20/10; G16Y 40/10; H04N 7/18
    See application file for complete search history.

(56) References Cited

U.S. PATENT DOCUMENTS

2019/0311404 A1\* 10/2019 Wasserman ...... G08G 1/096716
2019/0371085 A1   12/2019 Kishikawa et al.
2020/0166360 A1    5/2020 Jaganathan

FOREIGN PATENT DOCUMENTS

| JP | 2008-234044 A | 10/2008 |
| --- | --- | --- |
| JP | 2010-039705 A | 2/2010 |
| JP | 2012-108586 A | 6/2012 |
| JP | 2017-228286 A | 12/2017 |
| JP | 2018-169880 A | 11/2018 |
| JP | 2019-067088 A | 4/2019 |
| WO | 2017/047687 A1 | 3/2017 |
| WO | 2018/225347 A1 | 12/2018 |
| WO | 2019/142458 A1 | 7/2019 |

\* cited by examiner

BASE STATION, ROADSIDE DEVICE, TRAFFIC COMMUNICATION SYSTEM, TRAFFIC MANAGEMENT METHOD, AND TRAINING DATA GENERATION METHOD

RELATED APPLICATIONS

The present application is a continuation based on PCT Application No. PCT/JP2020/028564, filed on Jul. 22, 2020, which claims the benefit of Japanese Patent Application No. 2019-138999 filed on Jul. 29, 2019 and Japanese Patent Application No. 2019-214078 filed on Nov. 27, 2019. The content of which is incorporated by reference herein in their entirety.

TECHNICAL FIELD

The present disclosure relates to a base station, a roadside device, a traffic communication system, a traffic management method, and a training data generation method.

BACKGROUND ART

In recent years, Intelligent Transport Systems (ITSs) have attracted attention as technology for enabling avoidance of insecurity of traffic accidents.

As one such system, Non-Patent Literature 1 describes a system including a roadside device corresponding to a base station installed on a roadside, and an in-vehicle device corresponding to a mobile station installed in a vehicle, the roadside device and the in-vehicle device performing wireless communication.

As a use case of the roadside device, the roadside device may determine whether any moving body (vehicle or pedestrian) is present on a road based on image data from an image sensor installed on the roadside (a so-called roadside camera), and transmit a result of the determination to nearby vehicles, allowing prevention of accidents.

In addition, Patent Document 1 describes a system in which, in a situation where a plurality of vehicles are traveling on a road, a driver of a succeeding vehicle is warned when the succeeding vehicle acquires route history data from a preceding vehicle traveling in a lane identical to that in which the succeeding vehicle is traveling, and based on the route history data acquired, determines that a traffic obstacle is present in the lane.

Specifically, in the system described in Patent Document 1, in a case where the preceding vehicle decelerates and then changes the lane, the succeeding vehicle considers that the preceding vehicle has avoided a traffic obstacle, and determines that the traffic obstacle is present. In other words, the presence or absence of the traffic obstacle is determined by pattern matching for determining whether the preceding vehicle has performed a behavior predefined as a behavior for avoiding a traffic obstacle.

CITATION LIST

Non-Patent Literature

Non-Patent Literature 1: ARIB STD-T109 1.3 version "700 MHz Band Intelligent Transport System"

Patent Document

Patent Document 1: JP 2017-228286 A

SUMMARY

A base station according to a first feature used in a traffic communication system, the base station including a communicator configured to receive, via wireless communication, information transmitted from a vehicle traveling on a road, and a controller configured to identify, based on the information received by the communicator, a traveling behavior including a travel route of the vehicle on the road. The controller is configured to execute first processing for performing statistical learning or machine learning on a plurality of the traveling behaviors respectively identified for a plurality of the vehicles traveling on the road, and second processing for determining, based on a result of the first processing, presence or absence of a traffic obstacle on the road and a position of the traffic obstacle on the road.

A traffic communication system according to a second feature includes a base station configured to receive, via wireless communication, information transmitted from a vehicle traveling on a road, and a controller configured to identify, based on the information received by the communicator, a traveling behavior including a travel route of the vehicle on the road. The controller executes first processing for performing statistical learning or machine learning on a plurality of the traveling behaviors respectively identified for a plurality of the vehicles traveling on the road, and second processing for determining, based on a result of the first processing, a position of a traffic obstacle on the road.

A traffic management method according to a third feature includes receiving, by a base station via wireless communication, information transmitted from a vehicle traveling on a road, identifying, based on the information received by the base station, a traveling behavior including a travel route of the vehicle on the road, performing first processing for performing statistical learning or machine learning on a plurality of the traveling behaviors respectively identified for a plurality of the vehicles traveling on the road, and performing second processing for determining a position of a traffic obstacle on the road based on a result of the first processing.

A traffic communication system according to a fourth feature includes an image sensor configured to capture an image of a moving body on a road to output image data, a receiver configured to receive, from the moving body via wireless communication, an uplink message including attribute data indicative of attributes of the moving body, and a generator configured to associate the attribute data included in the uplink message with the image data output by the image sensor to generate training data to be used in construction of a learning model by machine learning. The learning model is a model that identifies an attribute of the moving body from the image data output by the image sensor.

A roadside device according to a fifth feature installed along a road, the roadside device including a receiver configured to receive, from a moving body via wireless communication, a message including attribute data indicative of an attribute of the moving body on the road, and a generator configured to acquire image data from an image sensor configured to capture an image of the moving body and associate the attribute data included in the message with the image data to generate training data to be used in construction of a learning model by machine learning. The learning model is a model that identifies the attribute of the moving body from the image data output by the image sensor.

A training data generation method according to a sixth feature is a training data generation method executed on a traffic communication system and including receiving, via wireless communication, a message including attribute data indicative of an attribute of a moving body on a road, acquiring image data from an image sensor configured to capture an image of the moving body, and associating the attribute data included in the message with the image data to generate training data to be used in construction of a learning model by machine learning. The learning model is a model that identifies the attribute of the moving body from the image data output by the image sensor.

DESCRIPTION OF EMBODIMENTS

First Embodiment

In a system described in Patent Document 1, a behavior for avoiding traffic obstacles is predefined, but in some road environments, a vehicle may perform such a behavior even in the absence of a traffic obstacle. For example, the vehicle may decelerate and change lanes before reaching a junction where two lanes merge into one lane or an intersection, or the like. Consequently, the system described in Patent Document 1 may fail to appropriately determine the presence or absence of the traffic obstacle and the position of the traffic obstacle.

Additionally, the system described in Patent Document 1 also has a problem in that each vehicle determines the presence or absence of the traffic obstacle, and thus has an increased processing load.

Thus, an object of a first embodiment is to eliminate a need for the traffic obstacle determination processing of each vehicle, and to appropriately determine the presence or absence of the traffic obstacle and the position of a traffic obstacle.

A traffic communication system according to a first embodiment will be described with reference to the drawings. Note that in the following description of the drawings, the same or similar components will be denoted by the same or similar reference signs.

Configuration of Traffic Communication System

Figure 1:
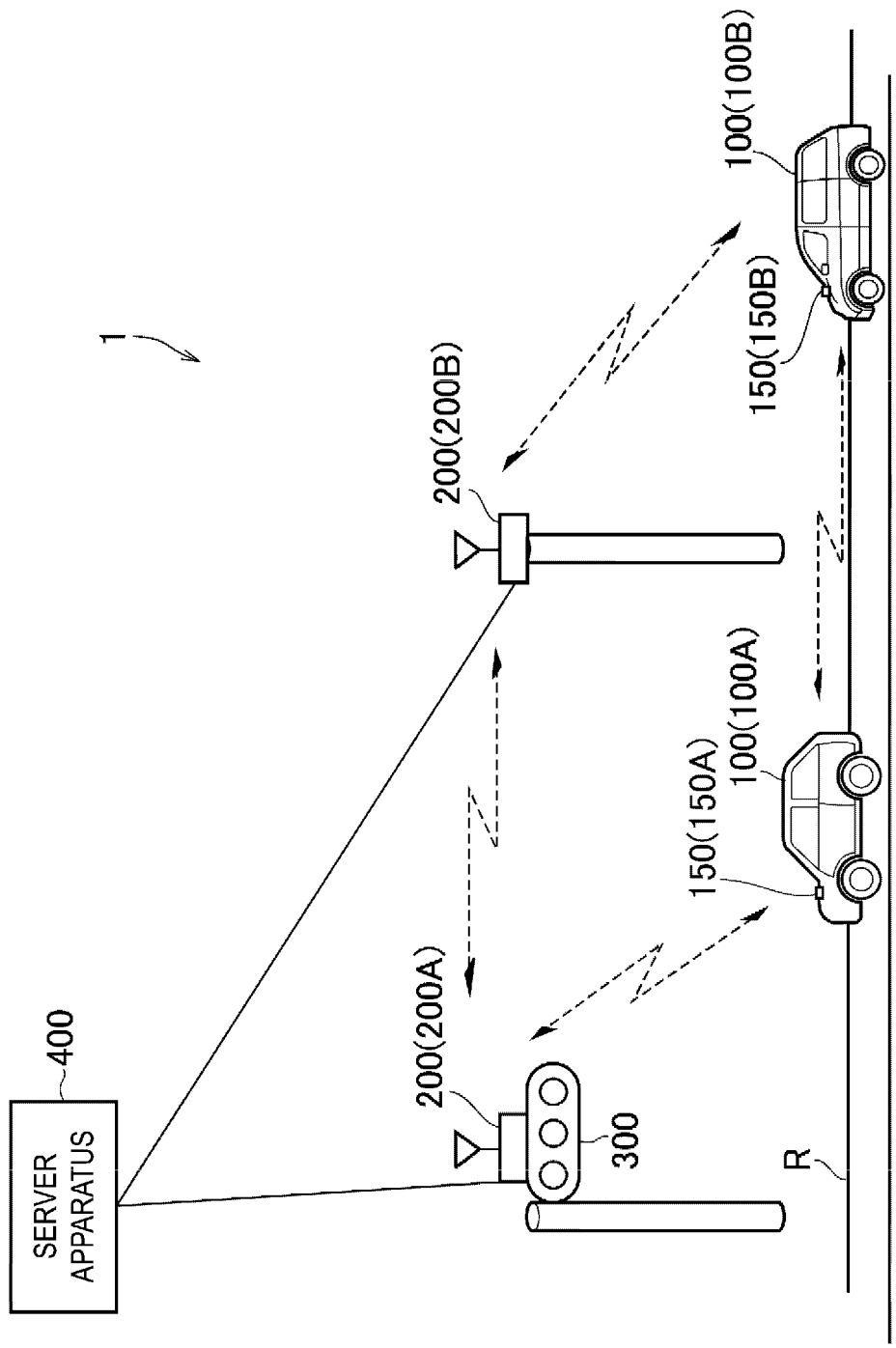
FIG. 1 is a diagram illustrating a configuration of a traffic communication system according to a first embodiment.

First, the configuration of traffic communication system according to the first embodiment will be described. FIG. 1 is a diagram illustrating a configuration of the traffic communication system 1 according to the first embodiment.

As illustrated in FIG. 1, the traffic communication system 1 includes vehicles 100 passing through a road R, and roadside devices 200 corresponding to base stations installed on the roadside of the road R. FIG. 1 illustrates vehicles 100A and 100B as the vehicles 100, and illustrates roadside devices 200A and 200B as the roadside devices 200. Note that as the vehicles 100, automobiles such as ordinary motor vehicles or light motor vehicles are illustrated but that the vehicles 100 may be any vehicles passing through the road R and may be, for example, motorcycles or the like.

Each vehicle 100 is equipped with an in-vehicle device 150 corresponding to a mobile station for performing wireless communication. The in-vehicle device 150 performs roadside-to-vehicle communication with the roadside device 200. In FIG. 1, an example is illustrated in which an in-vehicle device 150A and the roadside device 200A perform roadside-to-vehicle communication, and an in-vehicle device 150B and the roadside device 200B perform roadside-to-vehicle communication.

The roadside devices 200 are installed near the road R. The roadside devices 200 may each be installed at an intersection where two or more roads intersect. Each of the roadside devices 200 performs inter-roadside communication with the other roadside devices 200. In FIG. 1, an example is illustrated in which the roadside device 200A and the roadside device 200B perform inter-roadside communication via wireless communication, but the inter-roadside communication may be wired communication.

In the example illustrated in FIG. 1, the roadside device 200A is installed on a traffic light (traffic signal light) 300 or a support of the traffic light 300 and operates in conjunction with the traffic light 300. For example, the roadside device 200A transmits, to the vehicle 100 (in-vehicle device 150), a radio signal including signal information related to the traffic light 300. For such roadside-to-vehicle communication, broadcast wireless communication for a large number of unspecified destinations may be used. Alternatively, for the roadside-to-vehicle communication, multicast wireless communication for a large number of specified destinations may be used, or unicast wireless communication for a single specified destination may be used.

Each roadside device 200 is connected to a server apparatus 400 via a communication line. The communication line may be a wired line or a wireless line. A vehicle sensor installed on the roadside may be connected to the server apparatus 400 via the communication line. The server apparatus 400 receives, from each roadside device 200, information such as the position, speed, and the like of the vehicle 100 received by the roadside device 200 from the in-vehicle device 150. The server apparatus 400 may further receive vehicle sensing information from a roadside sensor installed at the road R. The server apparatus 400 collects and processes various traffic information based on the information received, and integrally manages road traffic.

Configuration of Roadside Device

Figure 2:
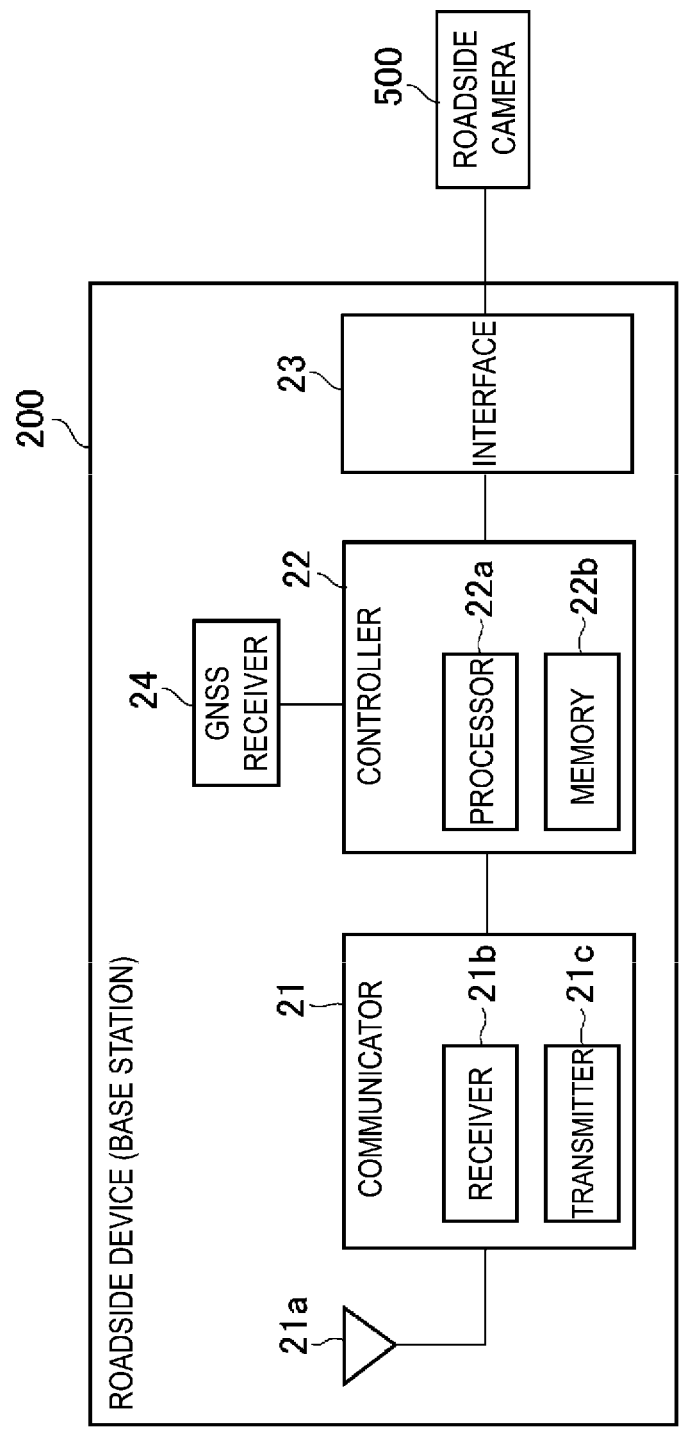
FIG. 2 is a diagram illustrating a configuration of a roadside device according to the first embodiment.

Now, the configuration of the roadside device 200 according to the first embodiment will be described. FIG. 2 is a diagram illustrating a configuration of the roadside device 200 according to the first embodiment.

As illustrated in FIG. 2, the roadside device 200 includes a communicator 21, a controller 22, and an interface 23.

The communicator 21 performs wireless communication (i.e., roadside-to-vehicle communication) with the in-vehicle device 150 provided on the vehicle 100. Specifically, the communicator 21 includes an antenna 21a, a receiver 21b, and a transmitter 21c, and performs wireless communication via the antenna 21a. The antenna 21a may be a non-directional antenna, or may be a directional antenna having directivity. The antenna 21a may be an adaptive array antenna that can dynamically change the directivity. The communicator 21 may perform inter-roadside communication with the other roadside devices 200.

The communicator 21 includes a receiver 21b that converts a radio signal received by the antenna 21a into receive data and outputs the receive data to the controller 22. Additionally, the communicator 21 includes a transmitter 21c that converts transmit data output by the controller 22 into a radio signal and transmits the radio signal from the antenna 21a.

A wireless communication scheme of the communicator 21 may be a scheme compliant with the T109 standard of Association of Radio Industries and Businesses (ARIB), a scheme compliant with the Vehicle-to-everything (V2X) standard of Third Generation Partnership Project (3GPP), and/or a scheme compliant with the wireless Local Area Network (LAN) standard such as the Institute of Electrical and Electronics Engineers (IEEE) 802.11 series. The communicator 21 may be configured to be capable of conforming to all of these communication standards.

The controller 22 controls various functions of the roadside device 200. The controller 22 includes at least one memory 22b and at least one processor 22a electrically connected to the memory 22b. The memory 22b includes a volatile memory and a non-volatile memory and stores information used for processing in the processor 22a and programs executed by the processor 22a. The memory 22b corresponds to a storage. The processor 22a executes programs stored in the memory 22b to perform various processing.

The interface 23 is connected to a roadside camera 500 via a wired line and/or a wireless line. The roadside camera 500 is an example of the roadside sensor. The roadside camera 500 outputs a captured image obtained by capturing an image of the road R. The interface 23 may further be connected to a roadside sensor other than the roadside camera 500, for example, an ultrasonic sensor or an infrared sensor.

The interface 23 is connected to the server apparatus 400 via a wired line and/or wireless line. The interface 23 may be wiredly or wirelessly connected to the traffic light 300. The interface 23 may be wiredly or wirelessly connected to the other roadside devices 200 and used for inter-roadside communication.

In the roadside device 200 configured in this manner, firstly, the communicator 21 receives, via wireless communication, information transmitted from the vehicle 100 traveling on the road R. The communicator 21 may periodically receive, from the vehicle 100, a roadside-to-vehicle communication message including various types of information.

The information received by the communicator 21 from the vehicle includes, for example, at least one of position information, vehicle speed information, acceleration information, steering information, and accelerator and brake information. The position information is information indicating the current position (latitude and longitude) of the vehicle 100. The vehicle speed information is information indicating the speed of the vehicle 100. The acceleration information is information indicating acceleration of the vehicle 100. The acceleration information may include information indicating acceleration in the front-back direction of the vehicle 100, as well as information indicating acceleration in the lateral direction of the vehicle 100. The steering information is information indicating the contents (direction and angle) of the steering operation of the vehicle 100. The accelerator and brake information is information indicating the contents of the accelerator operation and the brake operation of the vehicle 100.

Secondly, based on the information received by the communicator 21, the controller 22 identifies a traveling behavior including the travel route of the vehicle 100 on the road R. The controller 22 can identify the approximate travel route of the vehicle 100 based on, for example, the position information of the vehicle 100 periodically acquired. In a case where the position information is accurate position information such as the Quasi-Zenith Satellite System (QZSS) position information, the controller 22 can identify the detailed travel route of the vehicle 100 based on the position information. Alternatively, the controller 22 may identify the detailed travel route of the vehicle 100 based on the position information, the acceleration information (in particular, information indicating the acceleration in the lateral direction of the vehicle 100), and/or the steering information. The traveling behavior of the vehicle 100 may include, in addition to the travel route of the vehicle 100, a transition of changes in the speed of the vehicle 100, and/or a transition of changes in the acceleration of the vehicle 100.

Thirdly, the controller 22 executes the first processing for performing statistical learning or machine learning on the traveling behavior identified for each vehicle 100 traveling on the road R.

Fourthly, the controller 22 executes the second processing for determining the presence or absence of a traffic obstacle E on the road R and the position of the traffic obstacle E on the road R based on the result of the first processing.

In this manner, the controller 22 determines the presence or absence of the traffic obstacle E on the road R and the position of the traffic obstacle E on the road R based on the result of the statistical learning or machine learning executed on the traveling behavior identified for each vehicle 100 traveling on the road R.

This allows the appropriate determination of the presence or absence of the traffic obstacle and the position of the traffic obstacle, even in a case where the behavior for avoiding traffic obstacles is not predefined. Additionally, by determining, on the roadside device 200 side, the presence or absence of the traffic obstacle, a possible increase in the processing load on each vehicle can be suppressed. Thus, according to the roadside device 200 according to the first embodiment, the presence or absence of the traffic obstacle E on the road R and the position of the traffic obstacle E can be appropriately determined with a possible increase in the processing load on each vehicle 100 suppressed.

Figure 3A:
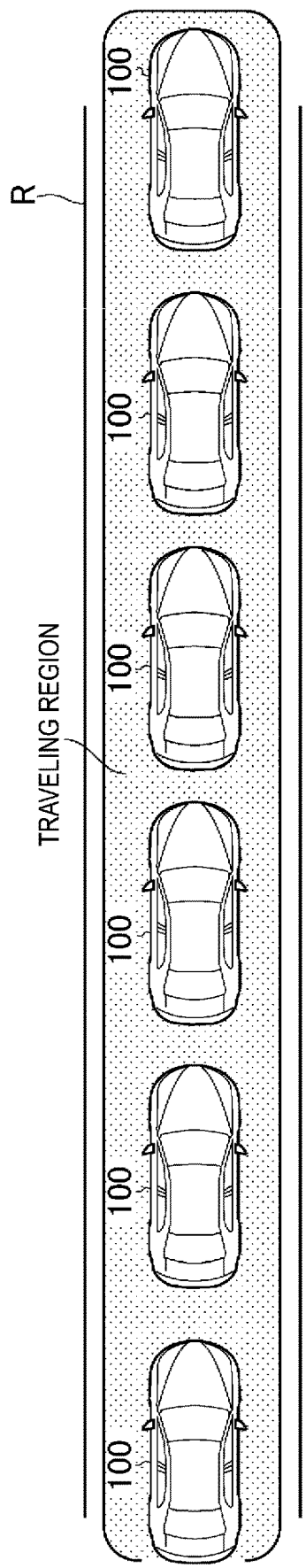
FIG. 3A is a diagram illustrating first processing and second processing performed by a roadside device according to the first embodiment in a case where a traffic obstacle E is not present on the road R.
Figure 3B:
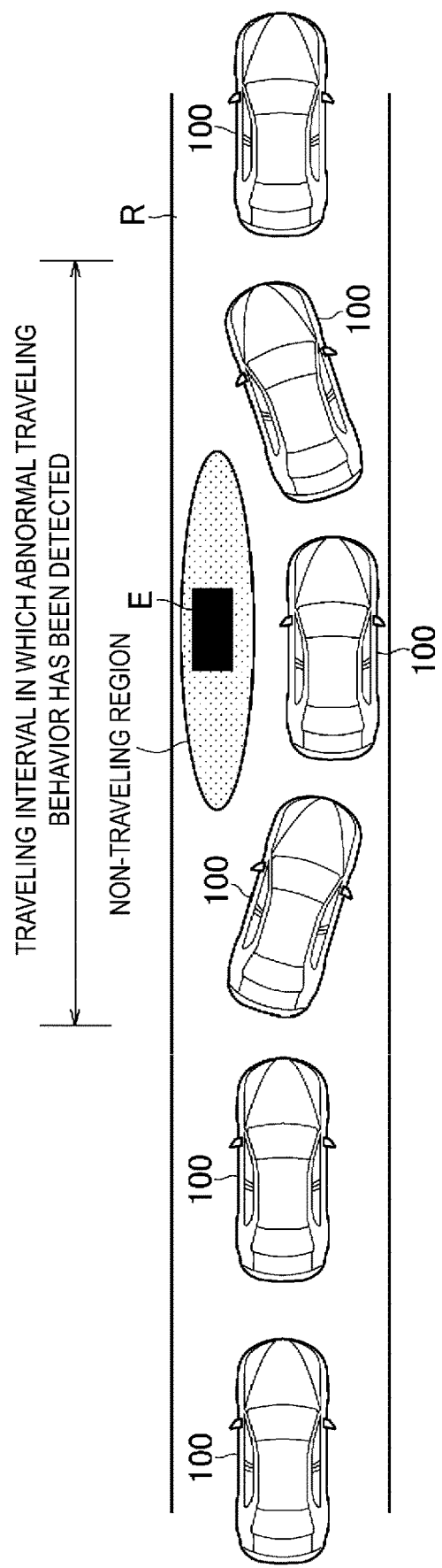
FIG. 3B is a diagram illustrating the first processing and the second processing performed by the roadside device according to the first embodiment in the case where the traffic obstacle E is present on the road R.

FIGS. 3A and 3B are diagrams illustrating the first processing and the second processing executed by the controller 22. FIG. 3A illustrates the travel route of one vehicle 100 in the absence of the traffic obstacle E on the road R, and FIG. 3B illustrates the travel route of one vehicle 100 in the presence of the traffic obstacle E on the road R. Note that the traffic obstacle E refers to, for example, a falling object, a disabled vehicle, road damage (for example, a hole), or the like.

In an operation pattern 1 of the roadside device 200, the first processing includes processing for statistically identifying a traveling region on the road R where each vehicle 100 travels, and detecting a non-traveling region in the traveling region identified where none of the vehicles 100 travel over a certain period of time after the identification of the traveling region. The second processing includes processing for determining that the traffic obstacle E is present in a case where the non-traveling region is detected, and determining the position of the traffic obstacle E based on the position of the non-traveling region detected.

For example, the controller 22 identifies the traveling region by aggregating the travel routes of the vehicles 100 on the road R. In this regard, the controller 22 may collect the time series data of the position of the subject vehicle from the plurality of vehicles 100 traveling on the road R, and determine the average of the respective data to identify the traveling region.

Then, after identifying the traveling region, the controller 22 monitors the travel routes of the vehicles 100 based on information received from the vehicles 100, detects a non-traveling region in the traveling region identified where none of the vehicles 100 travels over a certain period of time, and determines that the traffic obstacle E is present in the non-traveling region detected.

In an operation pattern 2 of the roadside device 200, the first processing includes processing for generating, by machine learning, behavioral information indicating an abnormal traveling behavior on the road R. The second processing includes processing for determining that the traffic obstacle E is present in a case where, based on the behavioral information generated, the abnormal traveling behavior is detected in the traveling behavior identified for the vehicle 100 traveling on the road R, and determining the position of the traffic obstacle E based on a traveling interval in which the abnormal traveling behavior is detected.

For example, the controller 22 learns the traveling behavior of each vehicle 100 over a certain period of time in a case where the traffic obstacle E is present on the road R or a test road simulating the road R. Specifically, machine learning is performed using, as training data, time series data (travel history) of information over a certain period of time from each vehicle 100 traveling on the road R, and a trained model indicating the abnormal traveling behavior is generated as behavioral information.

After generating the behavioral information, the controller 22 detects the abnormal traveling behavior in the traveling behavior identified for a target vehicle 100 traveling on the road R, based on the time series data of information (traveling behavior) over a certain period of time from the target vehicle 100, and the behavioral information generated. Then, the controller 22 determines the position of the traffic obstacle E based on the traveling interval in which the abnormal traveling behavior is detected.

Note that the controller 22 may perform only one of the above-described operation patterns 1 and 2. Alternatively, the controller 22 may use the determination based on the operation pattern 1 and the determination based on the operation pattern 2 to determine that the traffic obstacle E is present in a case where both determination results match.

Configuration of Vehicle

Figure 4:
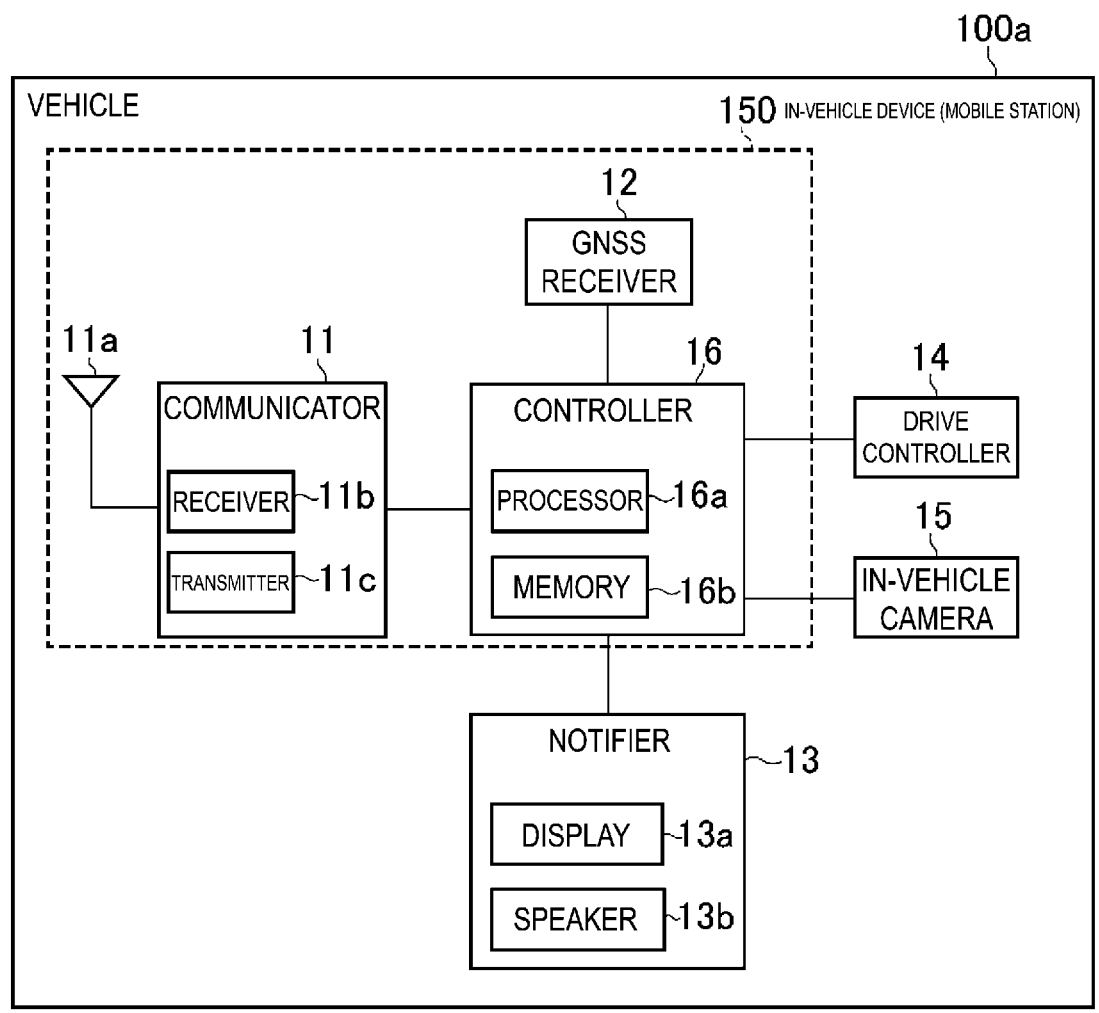
FIG. 4 is a diagram illustrating a configuration of a vehicle according to the first embodiment.

Now, the configuration of the vehicle 100 according to the first embodiment will be described. FIG. 4 is a diagram illustrating a configuration of the vehicle 100 according to the first embodiment.

As illustrated in FIG. 4, the vehicle 100 includes a communicator 11, a GNSS receiver 12, a notifier 13, a drive controller 14, an in-vehicle camera 15, and a controller 16. The communicator 11, the GNSS receiver 12, and the controller 16 constitute the in-vehicle device 150. The in-vehicle device 150 is an example of a mobile station.

The communicator 11 performs wireless communication (that is, roadside-to-vehicle communication) with the roadside device 200. Specifically, the communicator 11 includes an antenna 11a, a receiver 11b, and a transmitter 11c, and performs wireless communication via the antenna 11a. The communicator 11 includes the receiver 11b that converts a radio signal received by the antenna 11a into a receive data and outputs the receive data to the controller 16. Additionally, the communicator 11 includes the transmitter 11c that converts transmit data output by the controller 16 into a radio signal and transmits the radio signal from the antenna 11a.

A wireless communication scheme of the communicator 11 may be a scheme compliant with the T109 standard of ARIB, a scheme compliant with the V2X standard of 3GPP, and/or a scheme compliant with the wireless LAN standard such as the IEEE 802.11 series. The communicator 11 may be configured to be capable of conforming to all of these communication standards.

The GNSS receiver 12 receives a GNSS signal from a Global Navigation Satellite System (GNSS) satellite, and outputs position information indicating the current position. The GNSS receiver 12 may include at least one GNSS receiver included in a GPS receiver, a Global Navigation Satellite System (GLONASS) receiver, an Indian Regional Navigational Satellite System (IRNSS) receiver, a COMPASS receiver, a Galileo receiver, and a Quasi-Zenith Satellite System (QZSS) receiver, for example.

Under the control of the controller 16, the notifier 13 notifies information to a driver of the vehicle 100. The notifier 13 includes a display 13a that displays information, and a speaker 13b that audibly outputs information.

The drive controller 14 controls an engine or a motor as a source of power, a power transmission mechanism, brakes, and the like. In a case where the vehicle 100 is an automatic driving vehicle, the drive controller 14 may control operation of the vehicle 100 in cooperation with the controller 16.

The in-vehicle camera 15 outputs, to the controller 16, a captured image obtained by capturing an image of the front of the vehicle 100.

The controller 16 controls various functions of the vehicle 100 (in-vehicle device 150). The controller 16 includes at least one memory 16b and at least one processor 16a electrically connected to the memory 16b. The memory 16b includes a volatile memory and a non-volatile memory and stores information used for processing in the processor 16a and programs executed by the processor 16a. The processor 16a executes programs stored in the memory 16b to perform various processing.

In the vehicle 100 configured as described above, the controller 16 controls the communicator 11 in such a manner as to transmit various information to the roadside device 200 via wireless communication. The controller 16 may control the communicator 11 in such a manner as to periodically transmit, to the roadside device 200, a roadside-to-vehicle communication message including various information. The information transmitted to the roadside device 200 includes, for example, at least one of position information, vehicle speed information, acceleration information, steering information, and accelerator and brake information.

Operation of Roadside Device

Figure 5:
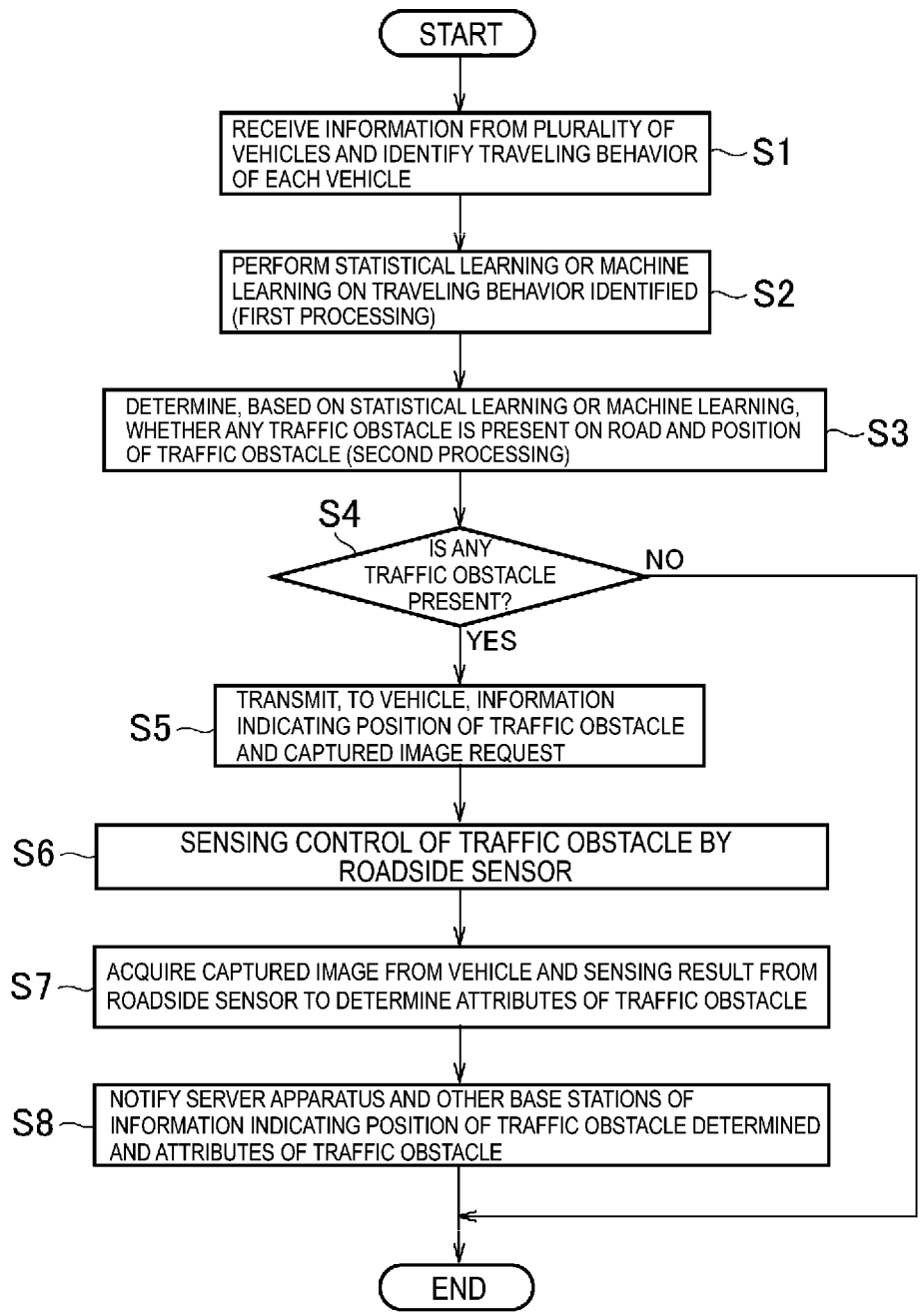
FIG. 5 is a diagram illustrating an operation of the roadside device according to the first embodiment.

Now, the operation of the roadside device 200 according to the first embodiment will be described. FIG. 5 is a diagram illustrating an operation of the roadside device 200 according to the first embodiment.

As illustrated in FIG. 5, in step S1, the communicator 21 receives, via wireless communication, information transmitted from each vehicle 100 traveling on the road R. Based on the information received by the communicator 21, the controller 22 identifies the traveling behavior including the travel route of each of the vehicles 100 on the road R, and stores information of the traveling behavior identified.

In step S2, the controller 22 executes the first processing for performing statistical learning or machine learning on the traveling behavior identified for each vehicle 100 in step S1.

In step S3, the controller 22 executes the second processing for determining the presence or absence of the traffic obstacle E on the road R and the position of the traffic obstacle E on the road R based on the result of the first processing.

In a case where the controller 22 determines that the traffic obstacle E is not present (step S4: NO), the flow ends.

On the other hand, in response to determining that the traffic obstacle E is present and determining the position of the traffic obstacle E (step S4: YES), in step S5, the controller 22 controls the communicator 21 in such a manner as to transmit information indicating the position of the traffic obstacle E determined in step S3, via roadside-to-vehicle communication to the vehicle 100 traveling toward the position of the traffic obstacle E. The information indicating the position of the traffic obstacle E is, for example, information indicating the longitude and latitude of the traffic obstacle E, the identifier of the lane in which the traffic obstacle E is present on the road R, or the relative position (e.g., the left side or right side) of the traffic obstacle E on the road R.

In step S5, the controller 22 may control the communicator 21 in such a manner as to transmit a captured image request requesting provision of a captured image from the in-vehicle camera 15, via roadside-to-vehicle communication to the vehicle 100 traveling toward the position of the traffic obstacle E determined in step S3.

The controller 22 may transmit, to the vehicle 100, one roadside-to-vehicle communication message including information indicating the position of the traffic obstacle E and a captured image request. Alternatively, the controller 22 may transmit the information indicating the position of the traffic obstacle E and the captured image request to the vehicle 100 via separate roadside-to-vehicle communication messages.

In a case where, in response to receiving, from the roadside device 200, the information indicating the position of the traffic obstacle E, the controller 16 of the vehicle 100 (in-vehicle device 150) determines that the traffic obstacle E is present in front of the subject vehicle in the feed direction, the controller 16 causes the notifier 13 to notify the driver that the traffic obstacle E is present in front of the subject vehicle in the feed direction and of the position of the traffic obstacle E. The controller 16 of the vehicle 100 (in-vehicle device 150) may perform vehicle speed control and steering control of the vehicle 100 in such a manner as to avoid the position of the traffic obstacle E.

Additionally, in response to receiving the captured image request from the roadside device 200, the controller 16 of the vehicle 100 (in-vehicle device 150) causes the in-vehicle camera 15 to capture an image of the front of the vehicle over a certain period of time to acquire the captured image (moving image). Alternatively, in response to receiving the captured image request from the roadside device 200, the controller 16 of the vehicle 100 (in-vehicle device 150) may control the in-vehicle camera 15 based on the information indicating the position of the traffic obstacle E in such a manner as to acquire a captured image (still image) only once immediately in front of the traffic obstacle E.

In step S6, the controller 22 controls the roadside sensor associated with the road R in such a manner as to perform sensing on the traffic obstacle E. For example, the controller 22 controls at least one of pan, tilt, and zoom of the roadside camera 500 in such a manner as to capture an image of the traffic obstacle E based on the position of the traffic obstacle E determined in step S3. Note that the order of step S5 and step S6 may be reversed.

In step S7, the controller 22 acquires the captured image of the in-vehicle camera 15 from the vehicle 100 via the communicator 21, acquires the captured image of the roadside camera 500 from the roadside camera 500 via the interface 23, and determines the attributes of the traffic obstacle E based on the acquired captured images. The attributes of the traffic obstacle E include the type of traffic obstacle E (e.g., a falling object, a disabled vehicle, or road damage). The attributes of the traffic obstacle E may include the size (e.g., large, medium, or small) of the traffic obstacle E. For example, the controller 22 determines the attributes of the traffic obstacle E by image recognition processing executed on the captured images. An image recognition technology using learning (e.g., knowledge based, statistics based, or neural network based learning) such as pattern matching technology or reinforcement learning can be applied to image recognition.

In step S8, the controller 22 notifies the server apparatus 400 for managing the road R, via the interface 23, of information indicating the position of the traffic obstacle E determined in step S3, and information indicating the attributes of the traffic obstacle E determined in step S7. This allows the server apparatus 400 to take an appropriate action to remove the traffic obstacle E.

In step S8, the controller 22 notifies the other roadside devices 200 associated with the road R, via the communicator 21, of information indicating the position of the traffic obstacle E determined in step S3, and information indicating the attribute of the traffic obstacle E determined in step S7 via inter-roadside communication. In response to receiving such a notification, the other roadside devices 200 transmit, via roadside-to-vehicle communication, the notified information indicating the position of the traffic obstacle E and the information indicating the attributes of the traffic obstacle E, for example. This allows the information related to the traffic obstacle E to be notified to a large number of vehicles 100 on the road R.

Figure 6:
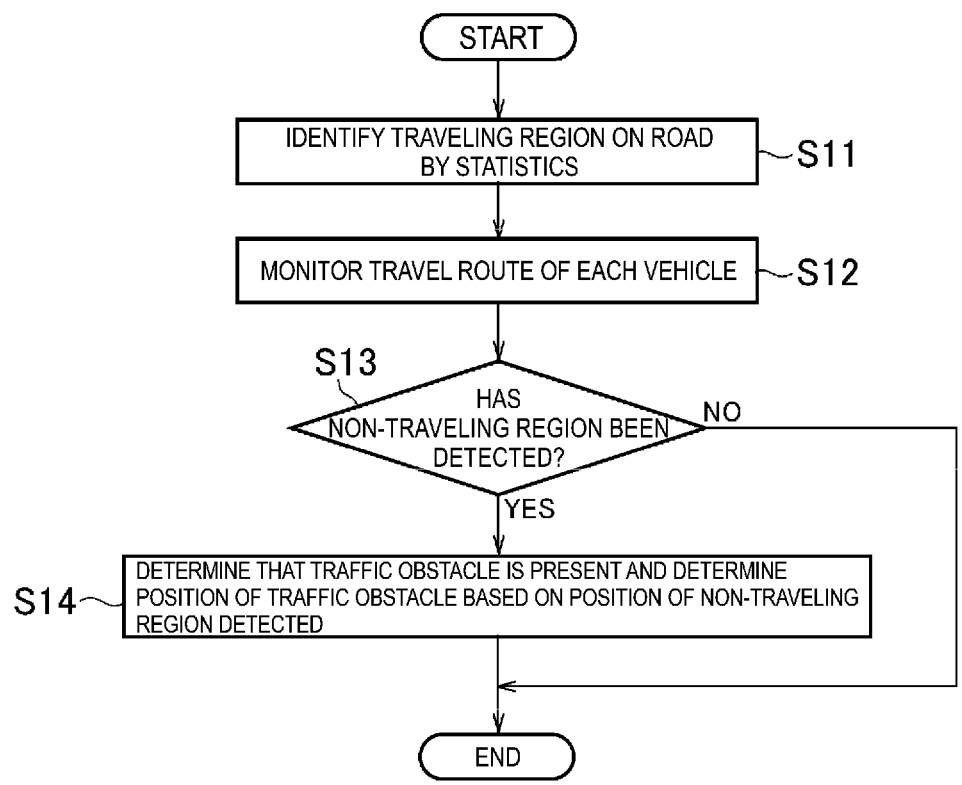
FIG. 6 is a diagram illustrating an operation pattern 1 of a traffic obstacle determination operation according to the first embodiment.

Now, the operation pattern 1 of the traffic obstacle E determination operation according to the first embodiment will be described. FIG. 6 is a diagram illustrating the operation pattern 1 of the traffic obstacle E determination operation according to the first embodiment.

As illustrated in FIG. 6, in step S11, the controller 22 aggregates the travel routes of the vehicles 100 on the road R to identify the traveling region.

In step S12, the controller 22 monitors the travel routes of the vehicles 100 based on information received from the vehicles 100.

In a case that a non-traveling region where none of the vehicles 100 travel over a certain period of time is detected in the traveling region by monitoring (step S13: YES), in step S14, the controller 22 determines that the traffic obstacle E is present, and determines the position of the traffic obstacle E based on the position of the non-traveling region detected. For example, the controller 22 may determine the center position of the non-traveling region as the position of the traffic obstacle E.

Figure 7:
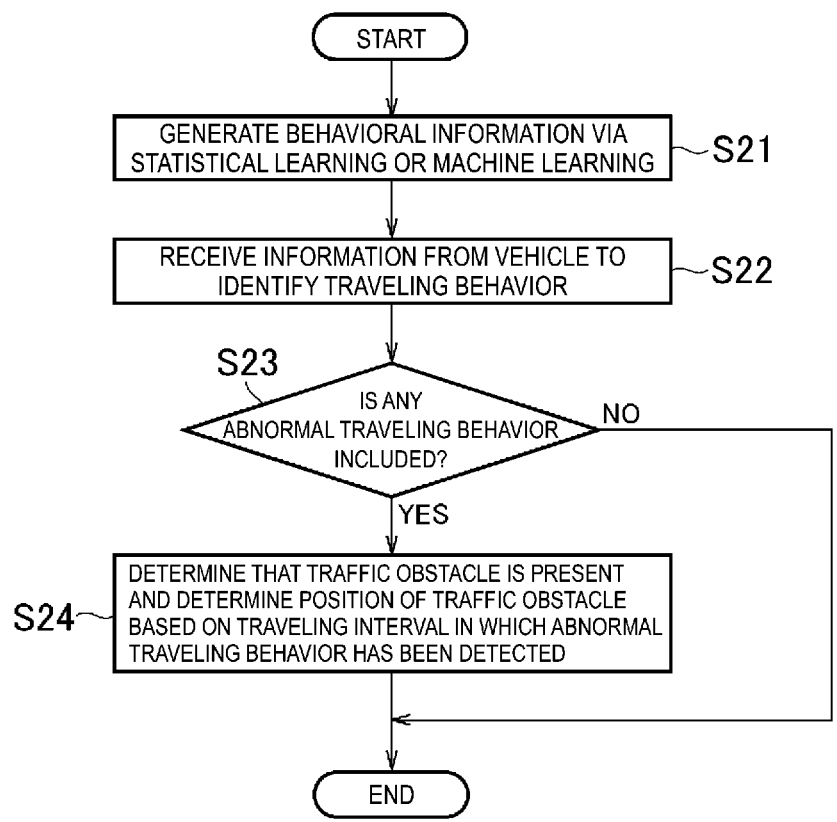
FIG. 7 is a diagram illustrating an operation pattern 2 of the traffic obstacle determination operation according to the first embodiment.

Now, the operation pattern 2 of the traffic obstacle E determination operation according to the first embodiment will be described. FIG. 7 is a diagram illustrating the operation pattern 2 of the traffic obstacle E determination operation according to the first embodiment.

As illustrated in FIG. 7, in step S21, the controller 22 learns, via machine learning, the traveling behavior of each vehicle 100 in a case where the traffic obstacle E is present, and generates behavioral information indicating the abnormal traveling behavior on the road R.

In step S22, based on information received from the vehicle 100 traveling on the road R, the controller 22 identifies the traveling behavior of the vehicle 100 over a certain period of time.

In step S23, the controller 22 determines whether the traveling behavior identified in step S22 includes the abnormal traveling behavior, based on the behavioral information generated in step S21 and the traveling behavior identified in step S22.

In response to determining that the traveling behavior identified in step S22 includes the abnormal traveling behavior (step S23: YES), in step S24, the controller 22 determines that the traffic obstacle E is present and determines the position of the traffic obstacle E based on the traveling interval in which the abnormal traveling behavior is detected. For example, the controller 22 may determine the center position of the traveling interval in which the abnormal traveling behavior is detected to be the position of the traffic obstacle E.

Second Embodiment

In recent years, image recognition technologies using machine learning have evolved, and it is considered that a moving body may be recognized from image data from the roadside camera using a trained model.

However, for machine learning, the image data is typically manually assigned labels (labeling) to generate training data, and the generation of training data involves a heavy work burden. In particular, the installation state of the roadside cameras (i.e., image capturing conditions) may vary from camera to camera, and thus the training data needs to be generated for each roadside camera, leading to a problem of an increased work burden of labeling.

Thus, an object of the second embodiment is to enable the construction of a learning model for image recognition for moving bodies while reducing the work burden.

A traffic communication system according to a second embodiment will be described with reference to the drawings. Note that in the following description of the drawings, the same or similar components will be denoted by the same or similar reference signs. A second embodiment will be described focusing on differences from the above-described first embodiment, and the description of similar or identical components is omitted.

Configuration of Traffic Communication System

Figure 8:
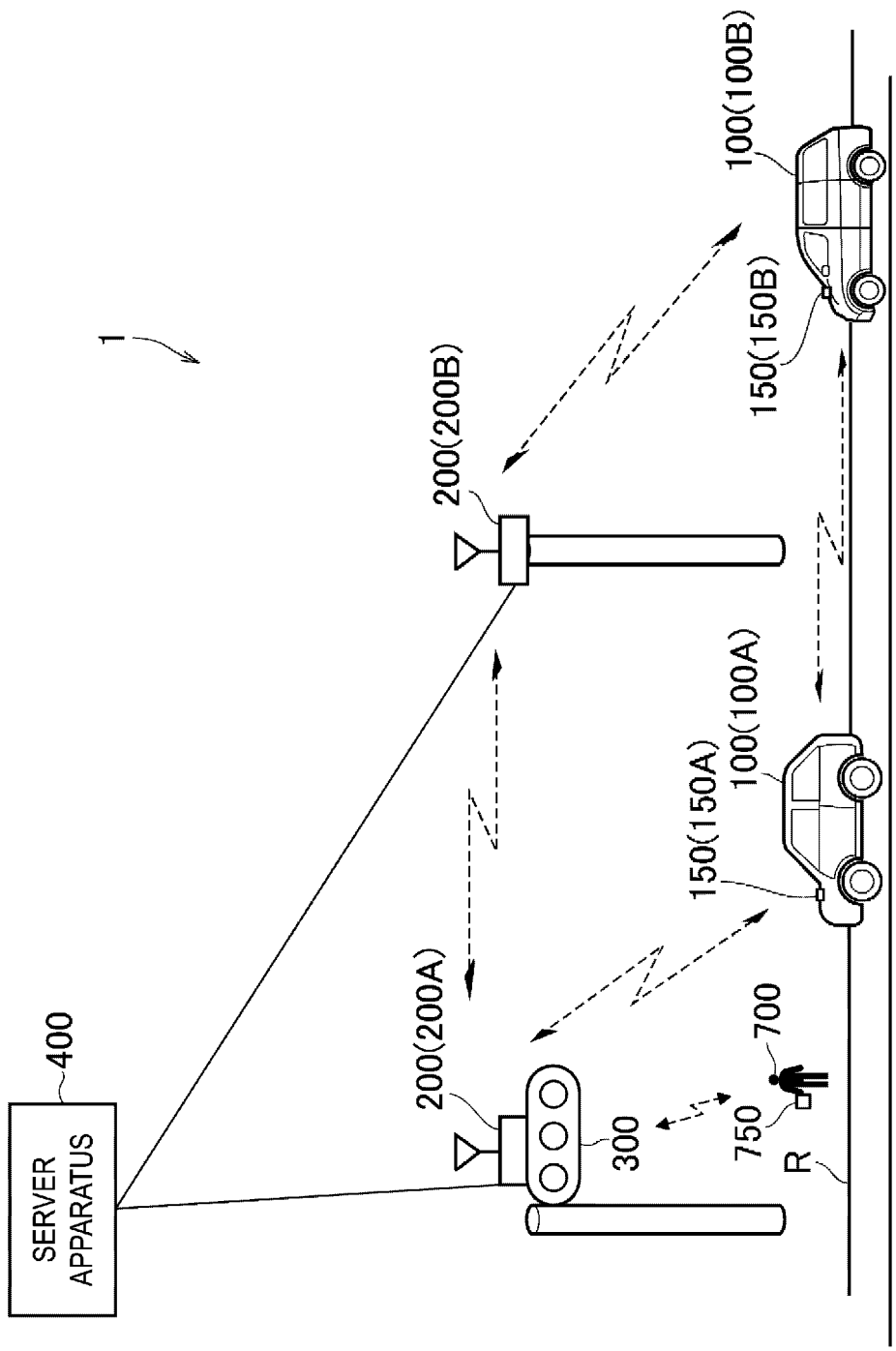
FIG. 8 is a diagram illustrating a configuration of a traffic communication system according to a second embodiment.

First, the configuration of the traffic communication system according to the second embodiment will be described. FIG. 8 is a diagram illustrating a configuration of the traffic communication system 1 according to the second embodiment.

As illustrated in FIG. 8, a traffic communication system 1 includes the vehicles 100 passing through the road R, and the roadside devices 200 corresponding to base stations installed on the roadside of the road R. The vehicle 100 is an example of a moving body. The configuration of the traffic communication system according to the second embodiment will be described below focusing on differences from the first embodiment, and the description of similar or identical components is omitted.

Each roadside device 200 is connected to the server apparatus 400 via a communication line. The communication line may be a wired line or a wireless line.

Each roadside device 200 may perform wireless communication with a terminal 750 of a pedestrian 700. The pedestrian 700 and the terminal 750 are other examples of moving bodies. The terminal 750 may be any terminal that can perform wireless communication with the roadside device 200. The terminal 750 may be, for example, a smartphone, a tablet terminal, a notebook PC, a wearable terminal, or the like.

Figure 9:
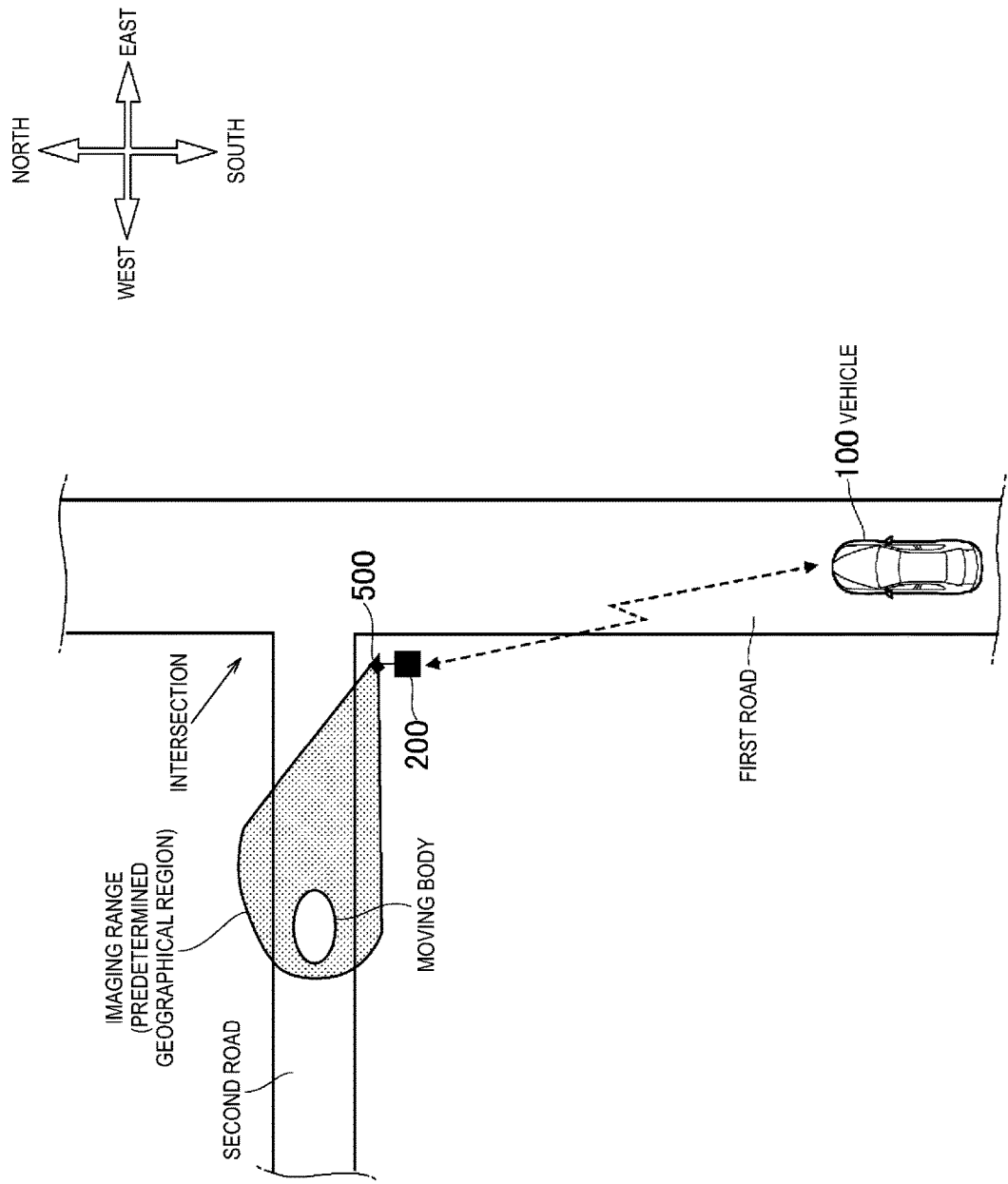
FIG. 9 is a diagram illustrating an installation environment of a roadside device according to the second embodiment.

FIG. 9 is a diagram illustrating an installation environment for the roadside device 200 according to the second embodiment.

As illustrated in FIG. 9, the roadside device 200 is installed near an intersection where a first road and a second road intersect. The roadside device 200 is provided with an image sensor 500 that captures an image of a predetermined geographic range on the second road. The image sensor 500 outputs, to the roadside device 200, image data obtained by image capturing.

The roadside device 200 executes image recognition processing on the image data output by the image sensor 500, and recognizes the presence or absence of a moving body on the second road and the attributes of the moving body. The moving body is at least one of the vehicle 100 and the pedestrian 700, for example. The roadside device 200 transmits, via roadside-to-vehicle communication, a downlink message related to the moving body recognized.

The vehicle 100 moving on the first road receives a downlink message from the roadside device 200, and executes processing based on the downlink message received. For example, the vehicle 100 performs notification or warning to the driver based on the downlink message from the roadside device 200, or controls the operation of the vehicle 100.

In a use case of such a roadside device 200, an artificial intelligence (AI) technology is utilized for the roadside device 200 to execute image recognition processing on image data output by the image sensor 500. Specifically, machine learning is used to construct a learning model for recognizing and identifying moving bodies, and image data is input to a constructed trained model, thus enabling moving bodies to be recognized and identified.

In the second embodiment, supervised learning is used as machine learning.

For such machine learning, in the related art, the image data is manually assigned labels (labeling) to generate training data, and the generation of training data involves a heavy work burden. In particular, the installation state of the image sensor 500 installed on the roadside (i.e., the image capturing conditions) may vary from image sensor 500 to image sensor 500, and thus training data needs to be generated for each image sensor 500, further increasing the work burden of labeling.

In the second embodiment, the roadside device 200 utilizes an uplink message received by the roadside device 200 in order to automate the labeling of the image data output by the image sensor 500. In other words, the roadside device 200 receives, from a moving body via wireless communication, an uplink message including the attribute data indicating the attributes of the moving body. Then, by associating the attribute data included in the uplink message with the image data output by the image sensor 500, the roadside device 200 automatically generates training data used to construct a learning model. Such a learning model is a model that identifies the attributes of the moving body from the image data output by the image sensor 500.

Thus, training data used to construct a learning model can be automatically generated for each image sensor 500, and thus a learning model for image recognition for moving bodies can be constructed with the work burden reduced. After a trained model is obtained, even in a case where a moving body includes no wireless communication function, the attributes of the moving body can be identified based on the image data.

Configuration of Roadside Device

Figure 10:
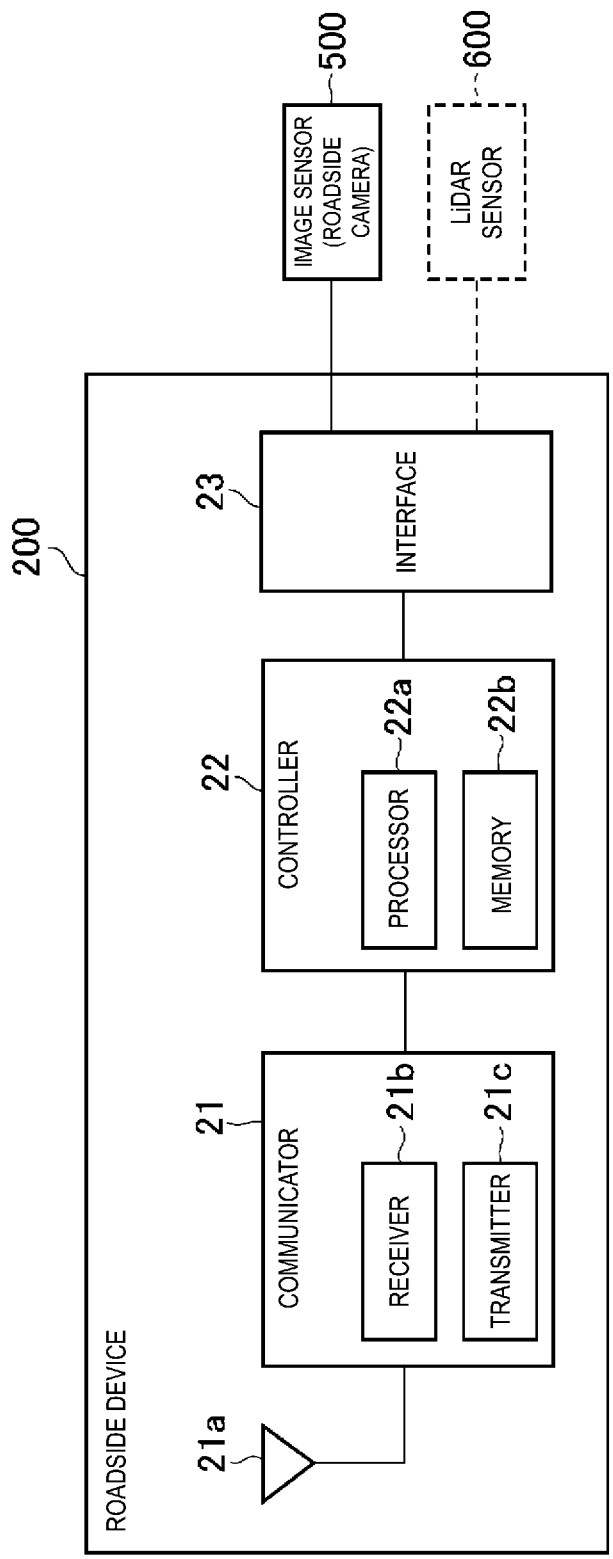
FIG. 10 is a diagram illustrating a configuration of the roadside device according to the second embodiment.

Now, the configuration of the roadside device 200 according to the second embodiment will be described. FIG. 10 is a diagram illustrating a configuration of the roadside device 200 according to the second embodiment.

As illustrated in FIG. 10, the roadside device 200 includes the communicator 21, the controller 22, and the interface 23.

The communicator 21 performs wireless communication (i.e., roadside-to-vehicle communication) with the in-vehicle device 150 provided on the vehicle 100. The communicator 21 may perform wireless communication with the terminal 750 of the pedestrian 700.

The communicator 21 includes the antenna 21a, the receiver 21b, and the transmitter 21c, and performs wireless communication via the antenna 21a. The antenna 21a may be a non-directional antenna, or may be a directional antenna having directivity. The antenna 21a may be an adaptive array antenna that can dynamically change the directivity. The receiver 21b converts a radio signal received by the antenna 21a into receive data and outputs the receive data to the controller 22. The transmitter 21c converts transmit data output by the controller 22 into a radio signal and transmits the radio signal from the antenna 21a.

The wireless communication scheme of the communicator 21 may be a scheme compliant with the T109 standard of Association of Radio Industries and Businesses (ARIB), a scheme compliant with the Vehicle-to-everything (V2X) standard of Third Generation Partnership Project (3GPP), and/or a scheme compliant with the wireless Local Area Network (LAN) standard such as the Institute of Electrical and Electronics Engineers (IEEE) 802.11 series. The communicator 21 may be configured to be capable of conforming to two or more of these communication standards.

The controller 22 controls various functions of the roadside device 200. The controller 22 includes at least one memory 22b and at least one processor 22a electrically connected to the memory 22b. The memory 22b includes a volatile memory and a non-volatile memory and stores information used for processing in the processor 22a and programs executed by the processor 22a. The memory 22b corresponds to a storage. The processor 22a executes programs stored in the memory 22b to perform various processing.

The interface 23 is connected to the at least one image sensor 500 via a wired line and/or a wireless line. The image sensor 500 outputs a captured image obtained by capturing an image of the road R. The image sensor 500 may be a roadside camera. The image sensor 500 may constitute a part of the roadside device 200.

The interface 23 may be connected to at least one Light Detection and Ranging (LiDAR) sensor 600 via a wired line and/or a wireless line. The LiDAR sensor 600 detects a moving body and outputs detection data (point cloud data). The LiDAR sensor 600 may be integrated with the image sensor 500. The LiDAR sensor 600 and the image sensor 500 may constitute a part of the roadside device 200.

The interface 23 is also connected to the server apparatus 400 via a wired line and/or a wireless line. The controller 22 communicates with the server apparatus 400 via the interface 23.

In the roadside device 200 configured as described above, firstly, the controller 22 acquires image data from the image sensor 500 that captures an image of a moving body on the road R and outputs the image data. The moving body is at least one of the vehicle 100 and the pedestrian 700, for example.

The receiver 21b wirelessly receives, from the moving body, an uplink message including attribute data indicating the attributes of the moving body.

The receiver 21b may receive the uplink message from the vehicle 100 (the in-vehicle device 150) or may receive the uplink message from the pedestrian 700 (terminal 750).

In this regard, in a case where the moving body is the vehicle 100, the attribute data may include data of at least one of the size type of the vehicle 100 and the application type of the vehicle 100 in addition to the data indicating that the moving body is the vehicle 100. The size type of the vehicle 100 includes, for example, large size vehicles, mid-sized vehicles, ordinary motor vehicles (including light motor vehicles), motorcycles (including motorbikes), bicycles, streetcars, and the like. The application type of the vehicle 100 includes, for example, private vehicles, emergency vehicles, passenger transportation vehicles, freight transportation vehicles, special vehicles, and the like. In a case where the moving body is the pedestrian 700, the attribute data includes data of at least one of the age group of the pedestrian and the moving state of the pedestrian in addition to data indicating that the moving body is the pedestrian 700. The age group of the pedestrian includes children, adults, seniors (elderly people), and the like. The moving state of the pedestrian includes at rest, walking, running, etc.

The uplink message may include position data indicating the geographic position (latitude and longitude) of the moving body corresponding to a transmission source. As such position data, for example, Global Navigation Satellite System (GNSS) position data can be utilized. Furthermore, the uplink message may include movement direction data indicating the movement direction of the moving body corresponding to a transmission source.

Secondly, the controller 22 associates the attribute data included in the uplink message received by the receiver 21b with the image data output by the image sensor 500 to generate training data used in the construction of a learning model by machine learning. In other words, the controller 22 functions as a generator for generating training data. A learning model constructed using such training data is a model that identifies the attributes of the moving body from the image data output by the image sensor 500. As described above, by assigning the image data with the attribute data included in the uplink message received by the receiver 21*b* as labels, the controller 22 automatically generates training data used for constructing a learning model. This allows the labeling of the image data to be automated by utilizing wireless communication with the moving body.

Instead of assigning the attribute data to the image data to generate training data, the controller 22 may assign the attribute data to a combination of the image data and detection data from the LiDAR sensor 600 to generate training data. The combined use of the detection data from the LiDAR sensor 600 enables the moving body to be recognized even at night, for example. Specifically, the controller 22 may associate the attribute data included in the uplink message with the image data output by the image sensor 500 and the detection data output by the LiDAR sensor 600 to generate training data. A learning model constructed using such training data is a model that identifies the attributes of the moving body from the combination of the image data output by the image sensor 500 and the detection data output by the LiDAR sensor 600. An example will be described below in which the image data to which the attribute data is assigned as labels is used as training data.

The receiver 21*b* of the roadside device 200 may also receive an uplink message from a moving body located outside the image capturing range (a predetermined geographic region on the road R) of the image sensor 500. In such a case, the labeling as described above may fail to function properly. Thus, in response to the position data that is included in the uplink message indicating a position within the image capturing range (the predetermined geographic region on the road R) of the image sensor 500, the controller 22 may associate the attribute data included in the uplink message with the image data output by the image sensor 500 to generate training data. In other words, in a case that the position data included in the uplink message indicates a position outside of the image capturing range (the predetermined geographic region on the road R) of the image sensor 500, the controller 22 generates no training data based on the uplink message. Note that information indicating the image capturing range (the predetermined geographic region on the road R) of the image sensor 500 is assumed to be stored in the controller 22 in advance.

However, even in a case where the moving body is located within the image capturing range of the image sensor 500, when the moving body moves away from the image sensor 500, identifying the attributes of the moving body is not so necessary. For example, as illustrated in FIG. 9, in a case where the roadside device 200 and the image sensor 500 are installed near the intersection, when the moving body moves on the second road away from the intersection, providing notification to the vehicle 100 moving on the first road is not so necessary. Thus, identifying the attributes of the moving body is not so necessary. Thus, in a case where the movement direction data included in the uplink message from the moving body indicates a predetermined movement direction (in the example of FIG. 9, the easterly direction, corresponding to a direction toward the intersection), the controller 22 associates the attribute data included in the uplink message with the image data output by the image sensor 500 to generate training data. In other words, in a case where the movement direction data included in the uplink message from the moving body does not indicate a predetermined movement direction, the controller 22 generates no training data based on the uplink message. Note that the information indicating the predetermined movement direction is assumed to be stored in the controller 22 in advance.

Thirdly, the controller 22 constructs a learning model using the training data generated. In other words, the controller 22 functions as a learner for constructing a learning model from the training data. In this case, the controller 22 uses machine learning (specifically, supervised learning) to construct a learning model from the training data generated, and stores a trained model corresponding to the learning model constructed.

Alternatively, the server apparatus 400 may function as the learner as described above. The controller 22 uploads the training data generated into the server apparatus 400, downloads the trained model obtained by the server apparatus 400 via machine learning, and stores the trained model downloaded.

Fourthly, the controller 22 uses the trained model to identify the attributes of the moving body from the image data output by the image sensor 500. In other words, the controller 22 functions as an identifier for identifying the attributes of the moving body.

For example, the controller 22 uses the trained model to identify whether the moving body included as a subject in the image data is the vehicle 100 or the pedestrian 700. In a case where the moving body included as a subject in the image data is the vehicle 100, the controller 22 may identify the size type of the vehicle 100 or identify the application type of the vehicle 100. In a case where the moving body included as a subject in the image data is the pedestrian 700, the controller 22 may identify the age group of the pedestrian 700 or identify the moving state of the pedestrian 700.

The controller 22 may determine a degree of insecurity related to traffic accidents based on the identification result for the moving body obtained using the trained model. For example, the controller 22 may determine that a moving body having an attribute indicating a statistically high occurrence frequency of traffic accidents has a high degree of insecurity, whereas a moving body not having such an attribute has a low degree of insecurity.

Fifthly, the controller 22 transmits, from the transmitter 21*c* via wireless communication, a downlink message including information based on the identification result for the moving body obtained using the trained model. The transmission of the downlink message is performed by broadcast, unicast, or multicast. For example, the controller 22 includes, in the downlink message, information indicating the attributes of the moving body identified using the trained model. The controller 22 may include, in the downlink message, information indicating the degree of insecurity determined based on the attributes of the moving body.

Configuration of Vehicle

Figure 11:
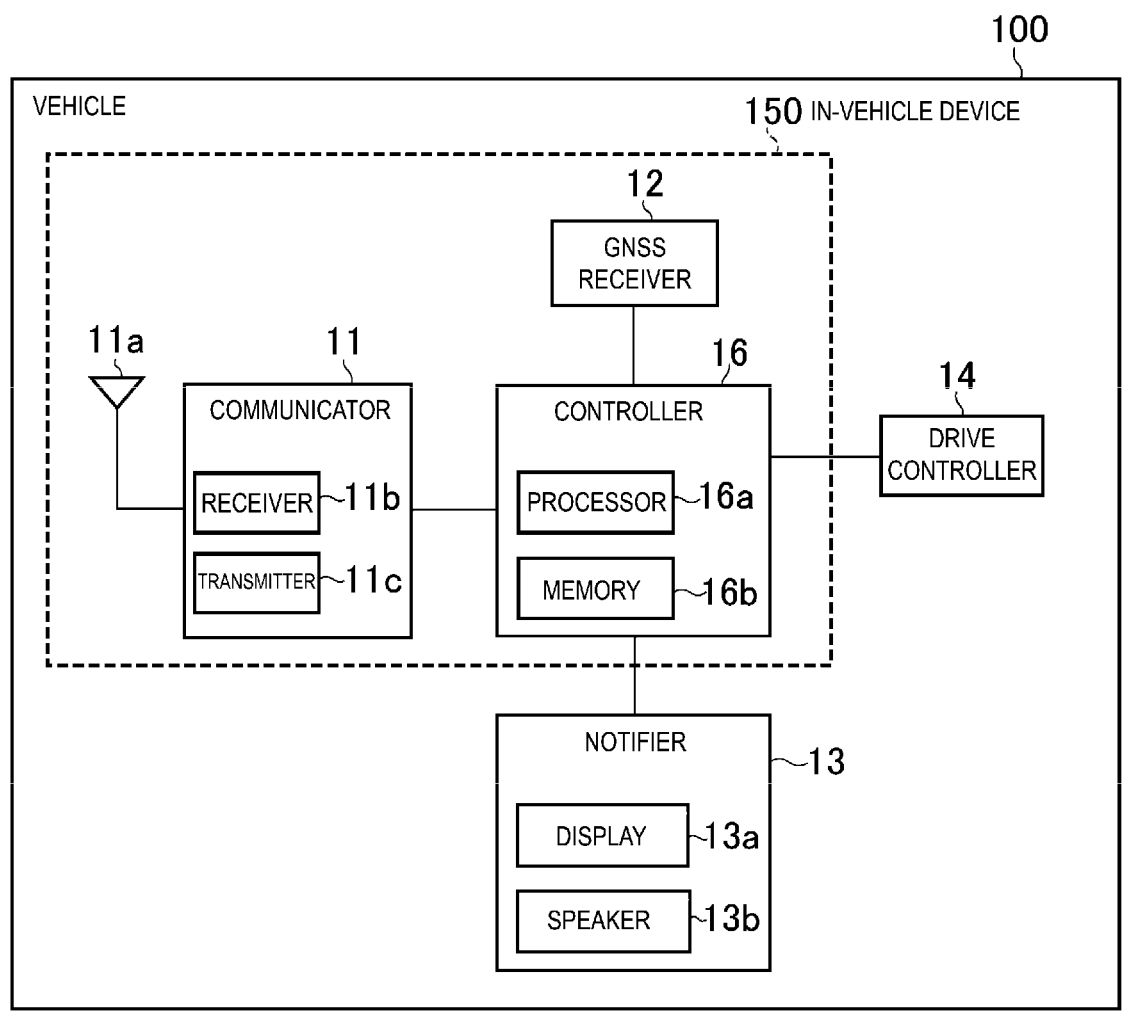
FIG. 11 is a diagram illustrating a configuration of a vehicle according to the second embodiment.

Now, the configuration of the vehicle 100 according to the second embodiment will be described. FIG. 11 is a diagram illustrating a configuration of the vehicle 100 according to the second embodiment.

As illustrated in FIG. 11, the vehicle 100 includes the communicator 11, the GNSS receiver 12, the notifier 13, the drive controller 14, and the controller 16. The communicator 11, the GNSS receiver 12, and the controller 16 constitute the in-vehicle device 150.

The communicator 11 performs wireless communication (that is, roadside-to-vehicle communication) with the roadside device 200. Specifically, the communicator 11 includes the antenna 11a, the receiver 11b, and the transmitter 11c, and performs wireless communication via the antenna 11a. The receiver 11b converts a radio signal received by the antenna 11a into receive data and outputs the receive data to the controller 16. The transmitter 11c converts the transmit data output by the controller 16 into a radio signal and transmits the radio signal from the antenna 11a.

The wireless communication scheme of the communicator 11 may be a scheme compliant with the T109 standard of ARIB, a scheme compliant with the V2X standard of 3GPP, and/or a scheme compliant with the wireless LAN standard such as the IEEE 802.11 series. The communicator 11 may be configured to be capable of conforming to two or more of these communication standards.

The GNSS receiver 12 receives the GNSS signal from the GNSS satellite and outputs position data indicating the current position. The GNSS receiver 12 may include at least one GNSS receiver included in a GPS receiver, a Global Navigation Satellite System (GLONASS) receiver, an Indian Regional Navigational Satellite System (IRNSS) receiver, a COMPASS receiver, a Galileo receiver, and a Quasi-Zenith Satellite System (QZSS) receiver, for example. The movement direction data is generated based on the position data.

Under the control of the controller 16, the notifier 13 notifies information to a driver of the vehicle 100. The notifier 13 includes the display 13a that displays information, and the speaker 13b that audibly outputs information.

The drive controller 14 controls an engine or a motor as a source of power, a power transmission mechanism, brakes, and the like. In a case where the vehicle 100 is an automatic driving vehicle, the drive controller 14 may control operation of the vehicle 100 in cooperation with the controller 16.

The controller 16 controls various functions of the vehicle 100 (in-vehicle device 150). The controller 16 includes at least one memory 16b and at least one processor 16a electrically connected to the memory 16b. The memory 16b includes a volatile memory and a non-volatile memory and stores information used for processing in the processor 16a and programs executed by the processor 16a. The processor 16a executes programs stored in the memory 16b to perform various processing.

In the vehicle 100 configured in this manner, the controller 16 generates an uplink message as described above, and transmits the uplink message generated from the transmitter 11c. The controller 16 may periodically generate and transmit an uplink message.

The receiver 11b receives the downlink message as described above from the roadside device 200, and outputs the downlink message received to the controller 16. The controller 16 controls the notifier 13 in such a manner as to notify the driver of information corresponding to the contents of the downlink message. For example, the controller 16 notifies information indicating the attributes of the moving body indicated by the downlink message, or notifies information indicating the degree of insecurity indicated by the downlink message. The controller 16 may control the drive controller 14 in such a manner as to perform automatic driving control in accordance with the contents of the downlink message. For example, the controller 16 may control steering and brake to prevent traffic accidents.

Operation Examples of Traffic Communication System

Figure 12:
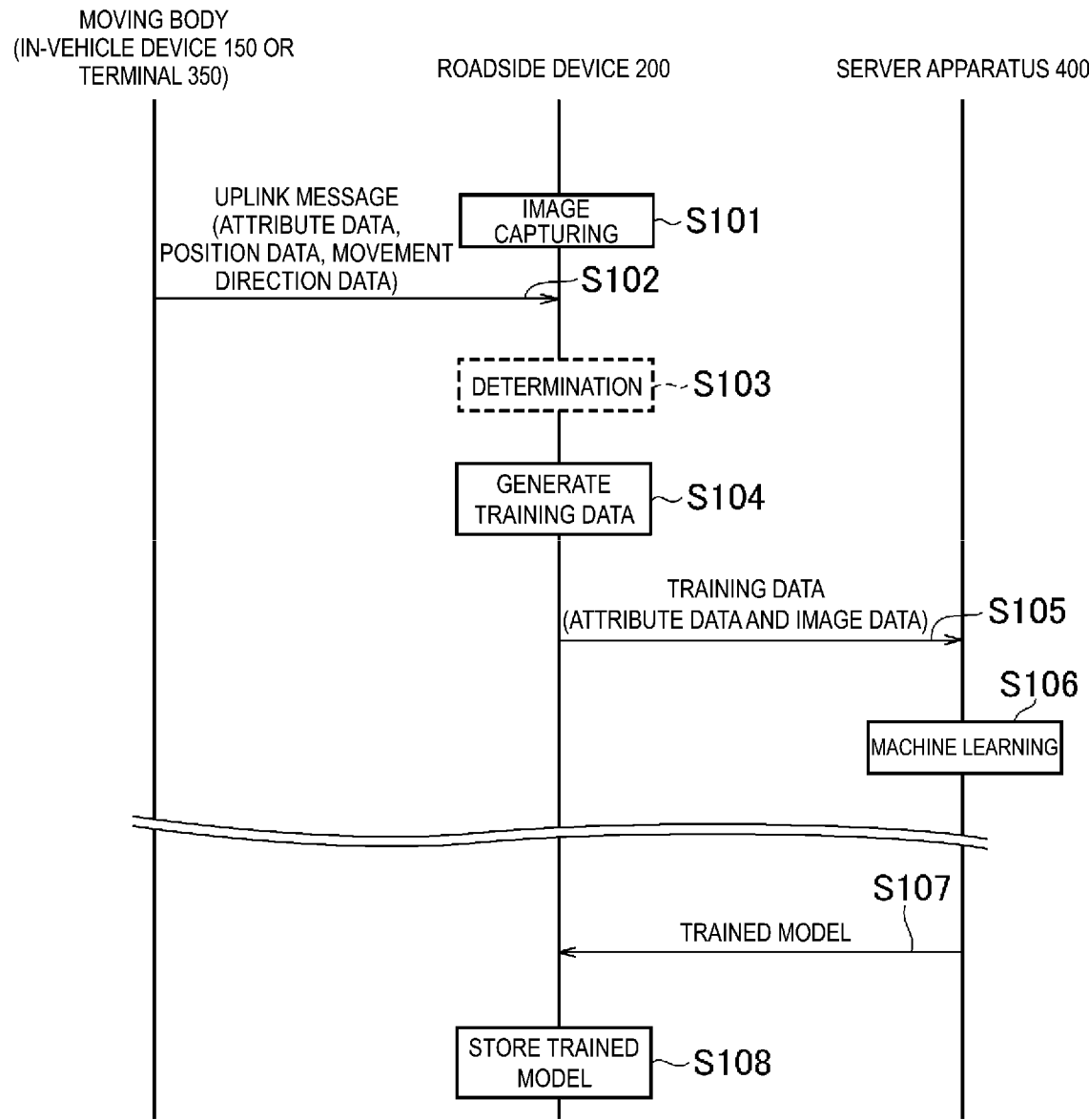
FIG. 12 is a diagram illustrating an operation example 1 for machine learning in the traffic communication system according to the second embodiment.

Now, operation examples of the traffic communication system 1 according to the second embodiment will be described. FIG. 12 is a diagram illustrating an operation example 1 for machine learning in the traffic communication system 1 according to the second embodiment.

As illustrated in FIG. 12, at step S101, the image sensor 500 captures an image of the moving body on the road to output the image data. The controller 22 of the roadside device 200 acquires the image data from the image sensor 500.

In step S102, the receiver 21b of the roadside device 200 receives an uplink message from the moving body. The uplink message includes the attribute data of the moving body. The uplink message may include position data and movement direction data of the moving body.

In step S103, the controller 22 of the roadside device 200 may determine whether to generate training data based on the uplink message received in step S102. For example, in a case where the position data included in the uplink message indicates a position within the image capturing range (the predetermined geographic region on the road R) of the image sensor 500, the controller 22 may determine that training data based on the uplink message is to be generated. In a case where the movement direction data included in the uplink message from the moving body indicates a predetermined movement direction, the controller 22 may determine that training data based on the uplink message is to be generated. The description below assumes that the controller 22 has determined that training data is to be generated.

In step S104, the controller 22 of the roadside device 200 associates the attribute data included in the uplink message received by the receiver 21b with the image data output by the image sensor 500 to generate training data used in the construction of a learning model by machine learning. Instead of assigning the attribute data to the image data to generate training data, the controller 22 may assign the attribute data to a combination of the image data and detection data from the LiDAR sensor 600 to generate training data.

In step S105, the controller 22 of the roadside device 200 uploads, to the server apparatus 400, the training data generated in step S104 (combination of the attribute data and the image data). Note that, in a case where a plurality of image sensors 500 are connected to the roadside device 200, the controller 22 may assign the ID of the corresponding image sensor 500 to the training data.

In step S106, the server apparatus 400 constructs a learning model by supervised learning from the training data uploaded from the roadside device 200. In a case where a plurality of image sensors 500 are connected to the roadside device 200, the server apparatus 400 may construct a learning model for each image sensor 500 based on the ID of the image sensor 500.

The server apparatus 400 continues collection of training data and construction (update) of a learning model until a certain condition is met, generating a trained model. The condition may be that a certain period of time elapses or that a certain number of pieces of training data are collected.

In step S107, the server apparatus 400 delivers the trained model to the roadside device 200. During the delivery of the trained model, the server apparatus 400 may notify the roadside device 200 of the ID of the corresponding image sensor 500.

In step S108, the controller 22 of the roadside device 200 stores the trained model acquired from the server apparatus 400. The controller 22 may store the trained model for each image sensor 500.

Figure 13:
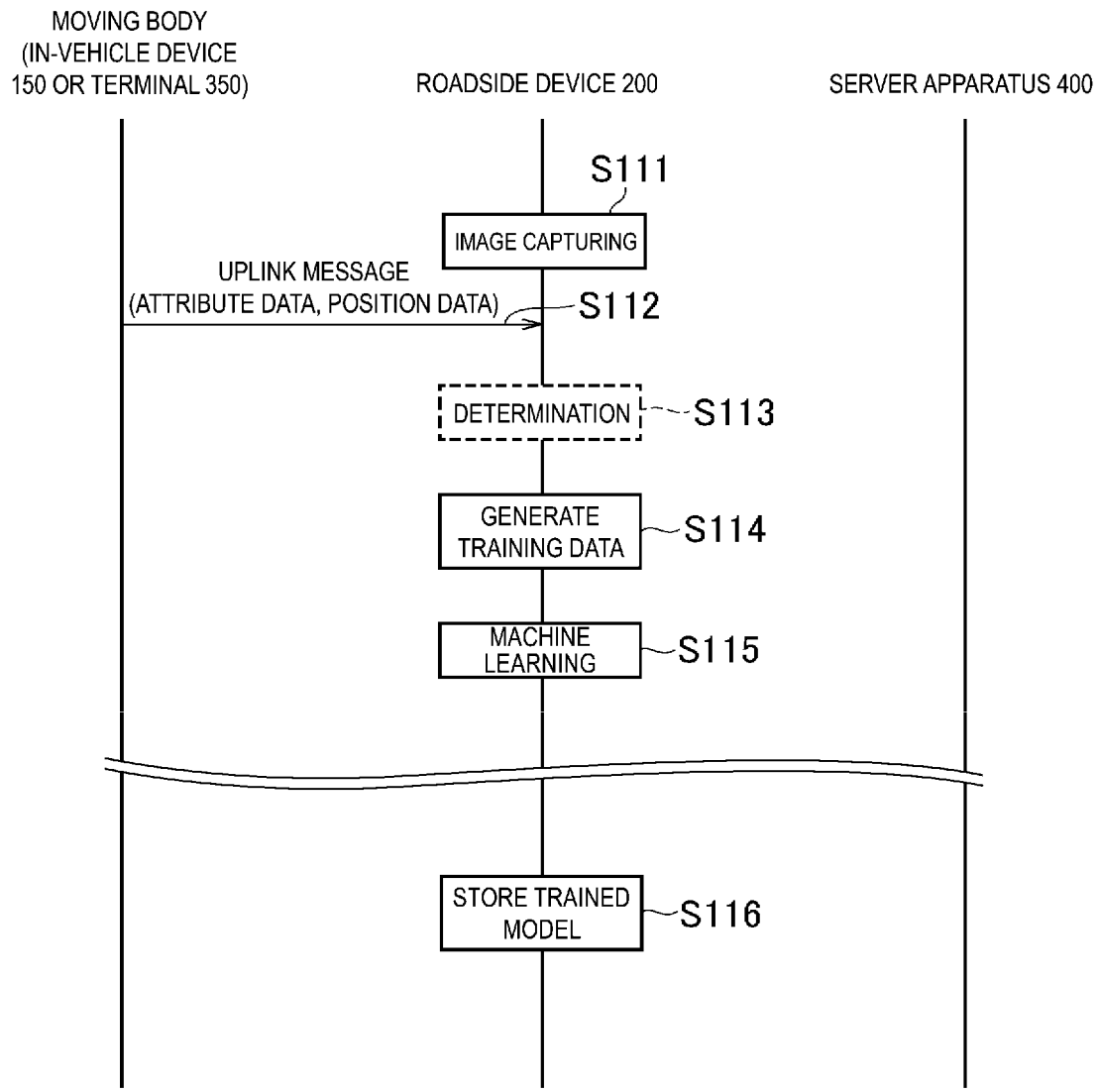
FIG. 13 is a diagram illustrating an operation example 2 for machine learning in the traffic communication system according to the second embodiment.

FIG. 13 is a diagram illustrating an operation example 2 for machine learning in the traffic communication system 1 according to the second embodiment.

As illustrated in FIG. 13, operations in steps S111 to S114 are similar to the operations in steps S101 to S104 described above.

In step S115, the controller 22 of the roadside device 200 constructs a learning model by supervised learning from the training data generated in step S114. In a case where a plurality of image sensors 500 are connected to the roadside device 200, the controller 22 may construct a learning model for each image sensor 500. The controller 22 continues collection of training data and construction (update) of a learning model until a certain condition is met, generating a trained model. The condition may be that a certain period of time elapses or that a certain number of piece of training data are collected.

In step S116, the controller 22 of the roadside device 200 stores the trained model generated. The controller 22 may store the trained model for each image sensor 500. The controller 22 may continue updating the trained model.

Figure 14:
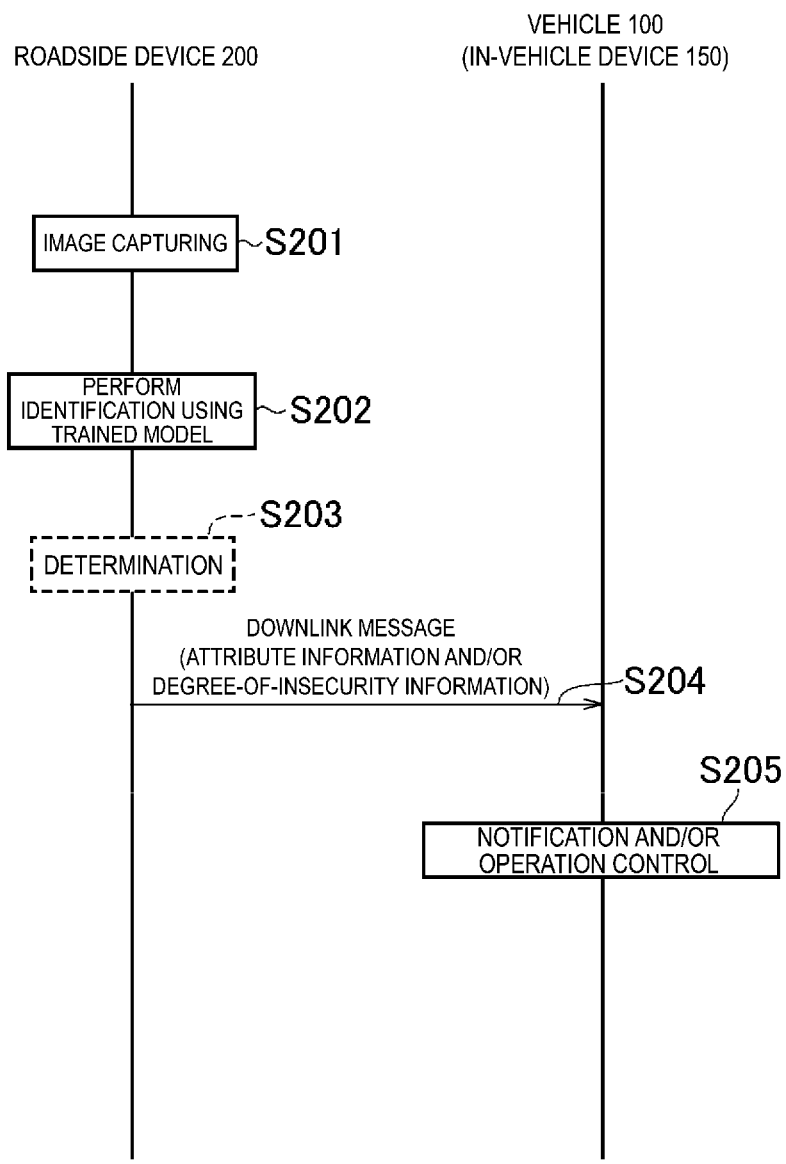
FIG. 14 is a diagram illustrating an operation example after generation of a trained model in the traffic communication system according to the second embodiment.

FIG. 14 is a diagram illustrating an operation example after generation of a trained model in the traffic communication system 1 according to the second embodiment.

As illustrated in FIG. 14, in step S201, the image sensor 500 captures an image of the moving body on the road and outputs the image data. The controller 22 of the roadside device 200 acquires the image data from the image sensor 500.

In step S202, the controller 22 of the roadside device 200 uses the trained model to identify the attributes of the moving body from the image data output by the image sensor 500.

In step S203, the controller 22 of the roadside device 200 may determine the degree of insecurity related to traffic accidents based on the identification result for the moving body obtained using the trained model.

In step S204, the controller 22 of the roadside device 200 transmits, from the transmitter 21c via wireless communication, the downlink message including information based on the identification result of the moving body using the trained model. The receiver 11b of the vehicle 100 receives a downlink message from the roadside device 200.

In step S205, the controller 16 of the vehicle 100 controls the notifier 13 in such a manner as to notify the driver of information corresponding to the contents of the downlink message received. The controller 16 may control the drive controller 14 in such a manner as to perform automatic driving control in accordance with the contents of the downlink message.

Other Embodiments

In the first embodiment, the operations illustrated in FIGS. 5 to 7 may be performed by the server apparatus 400 instead of the roadside device 200. In this case, in the description of the operations illustrated in FIGS. 5 to 7, the roadside device 200 is interpreted as the server apparatus 400. In this regard, the server apparatus 400 may be an edge server disposed near the roadside device 200. Specifically, the server apparatus 400 is provided between the roadside device 200 and the Internet, and manages the road R within an area limited to a predetermined range. The server apparatus 400 may be connected to the roadside device 200 via a Local Area Network (LAN) without using a WAN (Wide Area Network).

Figure 15:
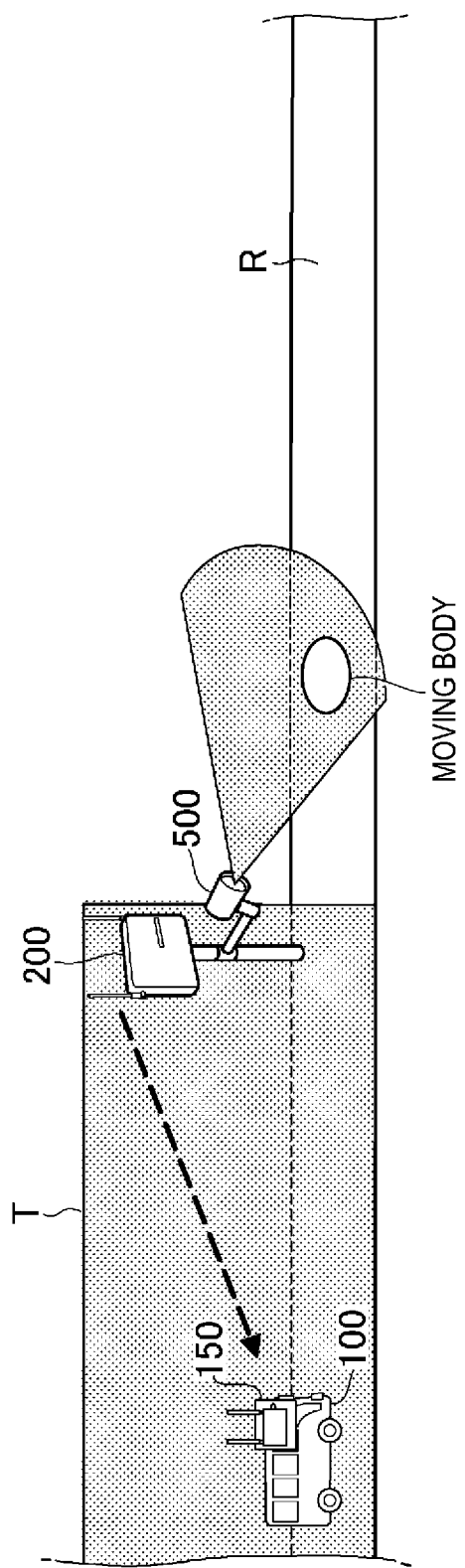
FIG. 15 is a diagram illustrating an installation environment of a roadside device according to another embodiment.

In the second embodiment described above, an example has been described in which the roadside device 200 and the image sensor 500 are disposed near the intersection. However, the roadside device 200 and the image sensor 500 may be installed near the end of a tunnel T, as illustrated in FIG. 15. In the example illustrated in FIG. 15, the image sensor 500 captures an image of an area around the end of the tunnel T and outputs the image data. The roadside device 200 transmits the downlink message as described above to the vehicle 100 (in-vehicle device 150) in the tunnel T.

Figure 16:
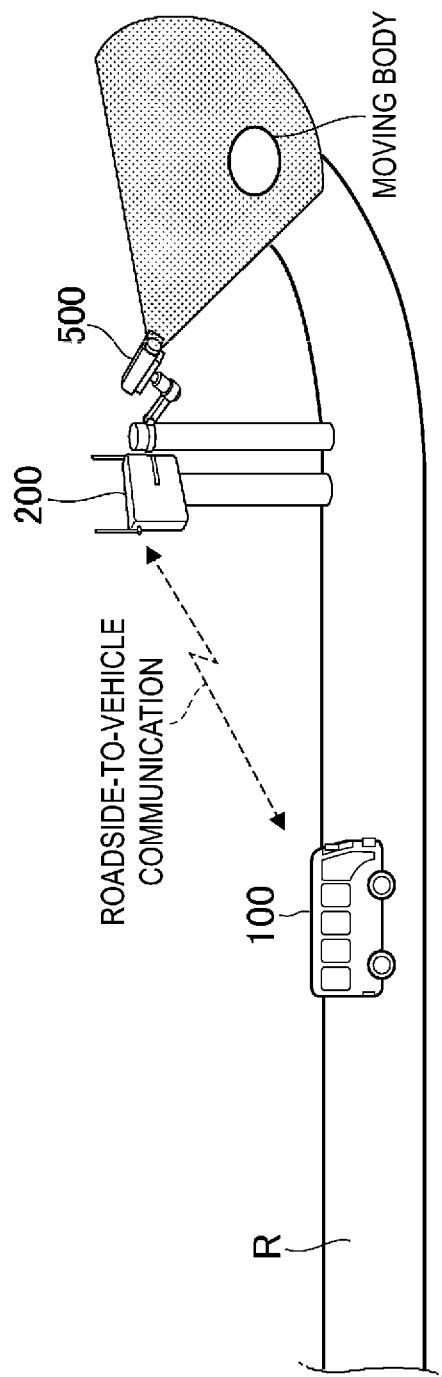
FIG. 16 is a diagram illustrating an installation environment of a roadside device according to another embodiment.

Alternatively, in the second embodiment described above, the roadside device 200 and the image sensor 500 may be installed near a corner (curve) of the road R, as illustrated in FIG. 16. In the example illustrated in FIG. 16, the road R has a curve to the left as viewed from the vehicle 100. It is difficult for the driver or in-vehicle sensor of the vehicle 100 to sense a situation beyond such a curve. A moving body that prevents the vehicle 100 from traveling may be present beyond such a curve. In the example illustrated in FIG. 16, the image sensor 500 captures an image of the situation beyond the curve and outputs the image data. The roadside device 200 transmits the downlink message as described above to the vehicle 100 (in-vehicle device 150) on the road R.

In the above-described second embodiment, the operations performed by the controller 22 of the roadside device 200 may be performed by the server apparatus 400 instead of the roadside device 200. In other words, the server apparatus 400 may include at least one of a generator that generates training data, a learner that performs machine learning, and an identifier that identifies the moving body using the trained model.

In the above-described second embodiment, the server apparatus 400 may be an edge server disposed near the roadside device 200. Such an edge server may be considered part of roadside device 200. The edge server is provided between the roadside device 200 and the Internet and manages the road R within an area limited to a predetermined range. The edge server may be connected to the roadside device 200 via a Local Area Network (LAN) without using a Wide Area Network (WAN).

The first and second embodiments described above may be combined as appropriate. For example, in a case where machine learning is performed in the first embodiment, machine learning in the second embodiment may be performed.

A program may be provided that causes a computer to execute each of the processing operations according to the first and second embodiments described above. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Additionally, circuits for performing the processing operations performed by the in-vehicle device 150 or the roadside device 200 may be integrated to configure at least a portion of the in-vehicle device 150 or the roadside device 200 as a semiconductor integrated circuit (chip set, SoC).

The first and second embodiments have been described above in detail with reference to the drawings; however, specific configurations are not limited to those described above, and various design modifications can be made without departing from the gist of the present disclosure.

The invention claimed is:

1. A traffic communication system comprising:
   an image sensor configured to capture an image of a moving body on a road to output image data;
   a receiver configured to receive, from the moving body via wireless communication, an uplink message including attribute data indicative of an attribute of the moving body;
   a generator configured to associate the attribute data included in the uplink message with the image data output by the image sensor to generate training data to be used in construction of a learning model by machine learning, wherein
   the learning model is a model that identifies an attribute of the moving body from the image data output by the image sensor; wherein
   the image sensor is configured to capture an image of a predetermined geographic region on the road,
   the uplink message includes position data indicating a geographic position of the moving body, and
   the generator is configured to associate, in response to the position data included in the uplink message indicating the position of the predetermined geographic region, the attribute data included in the uplink message with the image data output by the image sensor to generate the training data.

2. A traffic communication system comprising:
   an image sensor configured to capture an image of a moving body on a road to output image data;
   a receiver configured to receive, from the moving body via wireless communication, an uplink message including attribute data indicative of an attribute of the moving body;
   a generator configured to associate the attribute data included in the uplink message with the image data output by the image sensor to generate training data to be used in construction of a learning model by machine learning, wherein
   the learning model is a model that identifies an attribute of the moving body from the image data output by the image sensor; wherein
   the uplink message includes movement direction data indicating a movement direction of the moving body, and
   the generator is configured to associate, in response to the movement direction data included in the uplink message indicating a predetermined movement direction, the attribute data included in the uplink message with the image data output by the image sensor to generate the training data.

3. A traffic communication system comprising:
   an image sensor configured to capture an image of a moving body on a road to output image data;
   a receiver configured to receive, from the moving body via wireless communication, an uplink message including attribute data indicative of an attribute of the moving body;
   a generator configured to associate the attribute data included in the uplink message with the image data output by the image sensor to generate training data to be used in construction of a learning model by machine learning, wherein
   the learning model is a model that identifies an attribute of the moving body from the image data output by the image sensor;
      a light detection and ranging (LiDAR) sensor for detecting the moving body, wherein
   the generator associates the attribute data included in the uplink message with the image data output by the image sensor and detection data output by the LiDAR sensor to generate the training data, and
   the learning model is a model that identifies an attribute of the moving body from a combination of the image data output by the image sensor and the detection data output by the LiDAR sensor.

* * * * *